United States Patent
Liu et al.

(10) Patent No.: US 12,281,605 B2
(45) Date of Patent: Apr. 22, 2025

(54) EXHAUST GAS AFTERTREATMENT SYSTEM

(71) Applicant: CUMMINS EMISSION SOLUTIONS INC., Columbus, IN (US)

(72) Inventors: Z. Gerald Liu, Madison, WI (US); Apoorv Kalyankar, Madison, WI (US); Achuth Munnannur, Verona, WI (US); Niklas Schmidt, Madison, WI (US)

(73) Assignee: CUMMINS EMISION SOLUTIONS INC., Columbus, IN (US)

(*) Notice: Subject to any disclaimer, the term of this patent is extended or adjusted under 35 U.S.C. 154(b) by 0 days.

(21) Appl. No.: 18/291,362

(22) PCT Filed: Jul. 26, 2022

(86) PCT No.: PCT/US2022/038268
§ 371 (c)(1),
(2) Date: Jan. 23, 2024

(87) PCT Pub. No.: WO2023/009473
PCT Pub. Date: Feb. 2, 2023

(65) Prior Publication Data
US 2024/0376839 A1 Nov. 14, 2024

Related U.S. Application Data

(60) Provisional application No. 63/226,092, filed on Jul. 27, 2021.

(51) Int. Cl.
*F01N 3/02* (2006.01)
*F01N 3/021* (2006.01)
(Continued)

(52) U.S. Cl.
CPC ............... *F01N 3/20* (2013.01); *F01N 3/021* (2013.01); *F01N 13/08* (2013.01)

(58) Field of Classification Search
CPC .......... F01N 3/20; F01N 3/021; F01N 3/2892; F01N 3/2066; F01N 13/08;
(Continued)

(56) References Cited

U.S. PATENT DOCUMENTS 1,104,963 A 7/1914 Coanda
3,699,407 A 10/1972 Gurtler et al.
(Continued)

FOREIGN PATENT DOCUMENTS

CN 1864835 A 11/2006
CN 101501308 A 8/2009
(Continued)

OTHER PUBLICATIONS

Non-Final Office Action in U.S. Appl. No. 18/381,116 issued Mar. 28, 2024.
(Continued)

*Primary Examiner* — Dapinder Singh
(74) *Attorney, Agent, or Firm* — Foley & Lardner LLP

(57) ABSTRACT

An exhaust gas aftertreatment system includes an introduction gas conduit, a dosing module, a mixer, and an outlet flange. The introduction conduit is centered on a conduit center axis. The dosing module is coupled to the introduction conduit and includes an injector. The injector is configured to provide a treatment fluid into the introduction conduit and is defined by an injection axis. The mixer is disposed within the introduction conduit and includes a mixer body. The mixer body is configured to receive exhaust gas and the treatment fluid. The outlet flange includes an outlet flange body, an outlet flange opening, and a plurality of outlet flange perforations. The outlet flange body is centered on an outlet flange center axis. The outlet flange body includes an outlet flange body inner portion and an
(Continued)

outlet flange body outer portion. The outlet flange body inner portion is coupled to the mixer body.

16 Claims, 17 Drawing Sheets

(51) Int. Cl.
  *F01N 3/20* (2006.01)
  *F01N 13/08* (2010.01)
(58) Field of Classification Search
  CPC ......... F01N 2610/02; F01N 2610/1453; B01D 53/90; B01D 53/9477; B01D 2258/01; B01D 2251/2067; B01F 23/2132; B01F 25/3141; B01F 25/43161; B01F 25/435; B01F 25/4521; Y02T 10/12
  See application file for complete search history.

(56) References Cited

U.S. PATENT DOCUMENTS

| | | |
|---|---|---|
| 4,424,777 A | 1/1984 | Klomp |
| 6,444,177 B1 | 9/2002 | Muller et al. |
| 7,127,884 B2 | 10/2006 | Worner et al. |
| 7,581,387 B2 | 9/2009 | Bui et al. |
| 7,793,490 B2 | 9/2010 | Amon et al. |
| 7,836,688 B2 | 11/2010 | Woerner et al. |
| 7,866,143 B2 | 1/2011 | Buhmann et al. |
| 8,033,101 B2 | 10/2011 | Amon et al. |
| 8,230,678 B2 | 7/2012 | Aneja et al. |
| 8,371,114 B2 | 2/2013 | Hayashi et al. |
| 8,375,708 B2 | 2/2013 | Forster et al. |
| 8,460,610 B2 | 6/2013 | Silver et al. |
| 8,607,555 B2 | 12/2013 | Kaiser et al. |
| 8,615,984 B2 | 12/2013 | Kornherr et al. |
| 8,695,330 B2 | 4/2014 | Davidson et al. |
| 8,776,509 B2 | 7/2014 | Wikaryasz et al. |
| 8,789,363 B2 | 7/2014 | Iverson et al. |
| 9,021,794 B2 | 5/2015 | Goss et al. |
| 9,133,744 B2 | 9/2015 | Birkby et al. |
| 9,248,404 B2 | 2/2016 | Brunel et al. |
| 9,266,075 B2 | 2/2016 | Chapman et al. |
| 9,267,417 B2 | 2/2016 | Baldwin et al. |
| D757,919 S | 5/2016 | Kimura |
| 9,328,640 B2 | 5/2016 | Iverson et al. |
| 9,346,017 B2 | 5/2016 | Greber |
| 9,352,276 B2 | 5/2016 | Sampath |
| 9,453,444 B2 | 9/2016 | Fischer et al. |
| 9,464,546 B2 | 10/2016 | Perrot et al. |
| 9,504,960 B2 | 11/2016 | Park |
| 9,581,067 B2 | 2/2017 | Guilbaud et al. |
| D781,071 S | 3/2017 | Callif et al. |
| 9,605,573 B2 | 3/2017 | Solbrig et al. |
| 9,644,516 B1 | 5/2017 | Chiruta et al. |
| 9,664,081 B2 | 5/2017 | Rusch et al. |
| 9,714,598 B2 | 7/2017 | Alano et al. |
| D794,100 S | 8/2017 | McDonald et al. |
| 9,726,064 B2 | 8/2017 | Alano |
| 9,737,908 B2 | 8/2017 | Hornback et al. |
| 9,776,135 B2 | 10/2017 | Boeshans et al. |
| D809,577 S | 2/2018 | McDonald et al. |
| D816,010 S | 4/2018 | Rike |
| 9,995,193 B2 | 6/2018 | Alano et al. |
| 10,024,217 B1 | 7/2018 | Johnson et al. |
| 10,030,564 B2 | 7/2018 | Cossard et al. |
| 10,174,658 B2 | 1/2019 | Dimpelfeld et al. |
| 10,190,465 B2 | 1/2019 | Alano et al. |
| D840,908 S | 2/2019 | Rike |
| 10,215,075 B2 | 2/2019 | Chapman et al. |
| 10,247,081 B2 | 4/2019 | Niaz |
| 10,273,853 B2 | 4/2019 | Golin |
| 10,273,854 B1 | 4/2019 | Abbassi et al. |
| D849,662 S | 5/2019 | Rike |
| 10,287,948 B1 | 5/2019 | Moulieres et al. |
| 10,287,954 B2 | 5/2019 | Chapman et al. |
| 10,294,843 B2 | 5/2019 | Alano et al. |
| 10,316,721 B1 | 6/2019 | Moulieres et al. |
| D855,090 S | 7/2019 | McDonald et al. |
| 10,337,379 B2 | 7/2019 | Dimpelfeld et al. |
| 10,337,380 B2 | 7/2019 | Willats et al. |
| 10,422,268 B2 | 9/2019 | Niaz |
| 10,533,478 B2 | 1/2020 | Alano |
| 10,577,995 B2 | 3/2020 | Ker et al. |
| 10,612,443 B2 | 4/2020 | Li et al. |
| 10,632,430 B1 | 4/2020 | Liu et al. |
| 10,731,536 B1 | 8/2020 | Chenoweth et al. |
| 10,787,946 B2 | 9/2020 | Rohde et al. |
| 10,808,587 B2 | 10/2020 | Ottaviani et al. |
| 10,823,032 B2 | 11/2020 | Willats et al. |
| 10,907,522 B2 | 2/2021 | Poinsot et al. |
| 10,914,218 B1 | 2/2021 | Chapman et al. |
| 10,920,635 B2 | 2/2021 | Kozakiewicz |
| 10,920,642 B2 | 2/2021 | Wang et al. |
| 10,933,387 B2 | 3/2021 | Cvelbar |
| 10,967,329 B2 | 4/2021 | Alano et al. |
| 11,085,346 B2 | 8/2021 | Tucker et al. |
| 11,105,241 B2 | 8/2021 | Tucker et al. |
| 11,143,084 B2 | 10/2021 | Wahlstrom |
| 11,193,407 B2 * | 12/2021 | Lee ................... B01F 25/4315 |
| 11,193,412 B2 | 12/2021 | Cvelbar et al. |
| 11,230,958 B2 | 1/2022 | Tucker et al. |
| 11,242,788 B2 | 2/2022 | Kinnaird |
| 11,242,790 B2 | 2/2022 | Chapman et al. |
| 11,268,424 B2 | 3/2022 | Kimura et al. |
| 11,300,028 B2 | 4/2022 | Meunier |
| 11,313,266 B2 | 4/2022 | Tucker et al. |
| 11,428,140 B1 | 8/2022 | Kinnaird et al. |
| 11,441,461 B2 * | 9/2022 | Röhr ................... B01F 25/4315 |
| 11,459,927 B2 | 10/2022 | Rajashekharaiah et al. |
| 11,459,929 B2 | 10/2022 | Dimpelfeld et al. |
| 11,506,101 B2 | 11/2022 | Lebato et al. |
| 11,591,943 B2 | 2/2023 | Hornback |
| 11,746,684 B2 | 9/2023 | Wahlstrom |
| 11,761,365 B2 | 9/2023 | Liu et al. |
| 2002/0023435 A1 | 2/2002 | Woerner et al. |
| 2004/0112883 A1 | 6/2004 | Bowden et al. |
| 2004/0237511 A1 | 12/2004 | Ripper et al. |
| 2005/0172615 A1 | 8/2005 | Mahr |
| 2005/0262843 A1 | 12/2005 | Monty |
| 2006/0150614 A1 | 7/2006 | Cummings |
| 2006/0153748 A1 | 7/2006 | Huthwohl et al. |
| 2006/0191254 A1 | 8/2006 | Bui et al. |
| 2006/0260104 A1 | 11/2006 | Himi |
| 2006/0266022 A1 | 11/2006 | Woerner et al. |
| 2006/0283181 A1 | 12/2006 | Crawley et al. |
| 2007/0144126 A1 | 6/2007 | Ohya et al. |
| 2007/0163241 A1 | 7/2007 | Meingast et al. |
| 2007/0245718 A1 | 10/2007 | Cheng et al. |
| 2007/0283683 A1 | 12/2007 | Bellinger |
| 2007/0289294 A1 | 12/2007 | Werni et al. |
| 2008/0087013 A1 | 4/2008 | Crawley et al. |
| 2008/0121179 A1 | 5/2008 | Park et al. |
| 2008/0127635 A1 | 6/2008 | Hirata et al. |
| 2008/0314033 A1 | 12/2008 | Aneja et al. |
| 2009/0000283 A1 | 1/2009 | Endicott et al. |
| 2009/0019843 A1 | 1/2009 | Levin et al. |
| 2009/0031717 A1 | 2/2009 | Blaisdell |
| 2009/0049829 A1 | 2/2009 | Kaiser et al. |
| 2009/0084094 A1 | 4/2009 | Goss et al. |
| 2009/0145119 A1 | 6/2009 | Farrell et al. |
| 2009/0158717 A1 | 6/2009 | Kimura et al. |
| 2009/0158721 A1 | 6/2009 | Wieland et al. |
| 2009/0158722 A1 | 6/2009 | Kojima et al. |
| 2009/0180937 A1 | 7/2009 | Nohl et al. |
| 2009/0229254 A1 | 9/2009 | Gibson |
| 2009/0272106 A1 | 11/2009 | Werni et al. |
| 2010/0083641 A1 | 4/2010 | Makartchouk et al. |
| 2010/0146942 A1 | 6/2010 | Mayr et al. |
| 2010/0146948 A1 | 6/2010 | Dacosta et al. |
| 2010/0187383 A1 | 7/2010 | Olsen et al. |
| 2010/0251719 A1 | 10/2010 | Mancini et al. |
| 2010/0319329 A1 | 12/2010 | Khadiya |
| 2011/0005232 A1 | 1/2011 | Williams et al. |

(56) References Cited

U.S. PATENT DOCUMENTS

| | | |
|---|---|---|
| 2011/0079003 A1 | 4/2011 | Sun et al. |
| 2011/0094206 A1 | 4/2011 | Liu et al. |
| 2011/0099978 A1 | 5/2011 | Davidson et al. |
| 2011/0146237 A1 | 6/2011 | Adelmann et al. |
| 2011/0146253 A1 | 6/2011 | Isada et al. |
| 2011/0194987 A1 | 8/2011 | Hodgson et al. |
| 2012/0003955 A1 | 1/2012 | Gabriel |
| 2012/0124983 A1 | 5/2012 | Hong |
| 2012/0204541 A1 | 8/2012 | Li et al. |
| 2012/0204542 A1 | 8/2012 | Norris et al. |
| 2012/0204544 A1 | 8/2012 | Uhrich et al. |
| 2012/0216513 A1 | 8/2012 | Greber et al. |
| 2013/0067891 A1 | 3/2013 | Hittle et al. |
| 2013/0097819 A1 | 4/2013 | Kojima |
| 2013/0333363 A1* | 12/2013 | Joshi ............... B01F 25/3141 60/324 |
| 2014/0033686 A1 | 2/2014 | Fischer et al. |
| 2014/0230418 A1 | 8/2014 | Perrot et al. |
| 2014/0260209 A1 | 9/2014 | Goss et al. |
| 2014/0325967 A1 | 11/2014 | Kimura |
| 2014/0373721 A1 | 12/2014 | Sandou et al. |
| 2015/0000389 A1 | 1/2015 | Runde et al. |
| 2015/0016214 A1 | 1/2015 | Mueller |
| 2015/0089923 A1 | 4/2015 | Henderson et al. |
| 2015/0110681 A1 | 4/2015 | Ferront et al. |
| 2015/0121855 A1 | 5/2015 | Munnannur et al. |
| 2015/0204227 A1 | 7/2015 | Eager |
| 2015/0218996 A1 | 8/2015 | Brandl et al. |
| 2015/0224870 A1 | 8/2015 | Shin et al. |
| 2015/0233276 A1 | 8/2015 | Cassity et al. |
| 2015/0360176 A1 | 12/2015 | Bui et al. |
| 2016/0061090 A1 | 3/2016 | Anand et al. |
| 2016/0069239 A1 | 3/2016 | Freeman et al. |
| 2016/0083060 A1 | 3/2016 | Kassianoff |
| 2016/0090887 A1 | 3/2016 | Mitchell et al. |
| 2016/0115847 A1 | 4/2016 | Chapman et al. |
| 2016/0138454 A1 | 5/2016 | Alano et al. |
| 2016/0158714 A1 | 6/2016 | Li et al. |
| 2016/0175784 A1 | 6/2016 | Harmon et al. |
| 2016/0194991 A1 | 7/2016 | Clayton et al. |
| 2016/0243510 A1 | 8/2016 | Denton et al. |
| 2016/0251990 A1 | 9/2016 | Dimpelfeld et al. |
| 2016/0326931 A1 | 11/2016 | Freeman et al. |
| 2016/0332126 A1 | 11/2016 | Nande et al. |
| 2016/0361694 A1 | 12/2016 | Brandl et al. |
| 2016/0376969 A1 | 12/2016 | Zhang et al. |
| 2017/0067387 A1 | 3/2017 | Khaled |
| 2017/0089246 A1 | 3/2017 | Greber et al. |
| 2017/0107882 A1 | 4/2017 | Chiruta et al. |
| 2017/0152778 A1 | 6/2017 | Li et al. |
| 2017/0327273 A1 | 11/2017 | Lee et al. |
| 2017/0361273 A1 | 12/2017 | Zoran et al. |
| 2017/0370262 A1 | 12/2017 | Zoran et al. |
| 2018/0058294 A1 | 3/2018 | Zhang |
| 2018/0066559 A1 | 3/2018 | Haverkamp et al. |
| 2018/0078912 A1 | 3/2018 | Yadav et al. |
| 2018/0087428 A1 | 3/2018 | Barr |
| 2018/0142604 A1 | 5/2018 | Niaz |
| 2018/0266300 A1 | 9/2018 | Liu et al. |
| 2018/0306083 A1 | 10/2018 | Sampath et al. |
| 2018/0313247 A1 | 11/2018 | Bauknecht et al. |
| 2019/0063294 A1 | 2/2019 | Johnson et al. |
| 2019/0107025 A1 | 4/2019 | Brinkmeyer |
| 2019/0323397 A1 | 10/2019 | Pill et al. |
| 2020/0102873 A1 | 4/2020 | Ramolivo et al. |
| 2020/0123955 A1 | 4/2020 | Liu et al. |
| 2020/0131969 A1 | 4/2020 | Tucker et al. |
| 2020/0325811 A1 | 10/2020 | Levin et al. |
| 2020/0332696 A1 | 10/2020 | Chapman et al. |
| 2021/0039056 A1 | 2/2021 | De Rudder et al. |
| 2021/0095587 A1 | 4/2021 | Cvelbar et al. |
| 2021/0199039 A1 | 7/2021 | Panunzio et al. |
| 2021/0301704 A1 | 9/2021 | Hornback |
| 2021/0301710 A1 | 9/2021 | Cvelbar et al. |
| 2021/0363907 A1 | 11/2021 | Poinsot et al. |
| 2021/0404367 A1 | 12/2021 | Alano et al. |
| 2022/0065148 A1 | 3/2022 | Sudries et al. |
| 2022/0090532 A1 | 3/2022 | Degner et al. |
| 2022/0099121 A1 | 3/2022 | Kumar |
| 2022/0162975 A1 | 5/2022 | Cvelbar et al. |
| 2022/0162976 A1 | 5/2022 | Alano et al. |
| 2022/0178296 A1 | 6/2022 | Hogan |
| 2022/0184567 A1 | 6/2022 | Geant |
| 2022/0316382 A1 | 10/2022 | De Rudder |
| 2022/0349330 A1 | 11/2022 | Chapman et al. |
| 2022/0379272 A1 | 12/2022 | Alano |
| 2023/0003159 A1 | 1/2023 | Mittapalli et al. |
| 2023/0141549 A1 | 5/2023 | Kalyanshetti |

FOREIGN PATENT DOCUMENTS

| | | |
|---|---|---|
| CN | 101815851 A | 8/2010 |
| CN | 102242662 | 11/2011 |
| CN | 103429864 | 12/2013 |
| CN | 105143628 | 12/2015 |
| CN | 105612325 A | 5/2016 |
| CN | 105715340 A | 6/2016 |
| CN | 205559030 U | 9/2016 |
| CN | 106321199 A | 1/2017 |
| CN | 106377919 A | 2/2017 |
| CN | 206144632 U | 5/2017 |
| CN | 206144633 U | 5/2017 |
| CN | 106968765 A | 7/2017 |
| CN | 107435576 A | 12/2017 |
| CN | 107829805 A | 3/2018 |
| CN | 108194176 A | 6/2018 |
| CN | 108252771 A | 7/2018 |
| CN | 108708781 A | 10/2018 |
| CN | 108729999 A | 11/2018 |
| CN | 109268107 A | 1/2019 |
| CN | 109414661 A | 3/2019 |
| CN | 109477413 A | 3/2019 |
| CN | 208982145 U | 6/2019 |
| CN | 106014560 B | 7/2019 |
| CN | 209179849 A | 7/2019 |
| CN | 209586479 U | 11/2019 |
| CN | 209855888 U | 12/2019 |
| CN | 110761876 A | 2/2020 |
| CN | 210195855 U | 3/2020 |
| CN | 210686097 U | 6/2020 |
| CN | 210858906 U | 6/2020 |
| CN | 211082028 U | 7/2020 |
| CN | 211116205 U | 7/2020 |
| CN | 211573625 U | 9/2020 |
| CN | 111810276 A | 10/2020 |
| CN | 212130586 U | 12/2020 |
| CN | 212130587 U | 12/2020 |
| CN | 212296579 U | 1/2021 |
| CN | 112483224 A | 3/2021 |
| CN | 212744129 U | 3/2021 |
| CN | 214304014 U | 9/2021 |
| CN | 214836650 U | 11/2021 |
| CN | 214887318 U | 11/2021 |
| CN | 215109110 U | 12/2021 |
| CN | 215719044 U | 2/2022 |
| CN | 215719045 U | 2/2022 |
| CN | 216157745 U | 4/2022 |
| CN | 216617626 U | 5/2022 |
| CN | 217872989 U | 11/2022 |
| DE | 10021166 A1 | 11/2001 |
| DE | 103 12 212 A1 | 11/2003 |
| DE | 10 2004 043 931 A1 | 3/2006 |
| DE | 10 2010 014 037 A1 | 11/2010 |
| DE | 11 2009 000 650 T5 | 1/2011 |
| DE | 11 2010 002 589 T5 | 11/2012 |
| DE | 10 2014 101 889 | 8/2015 |
| DE | 10 2014 102 798 A1 | 9/2015 |
| DE | 10 2016 222 743 A1 | 5/2017 |
| DE | 10 2016 115 030 A1 | 2/2018 |
| DE | 10 2018 127 387 A1 | 5/2019 |
| DE | 10 2007 051 510 B4 | 2/2021 |
| DE | 10 2020 121 659 A1 | 3/2021 |
| EP | 0 716 918 A2 | 6/1996 |
| EP | 1 716 917 A1 | 11/2006 |

(56) References Cited

FOREIGN PATENT DOCUMENTS

| | | | |
|---|---|---|---|
| EP | 2 769 762 A1 | 8/2014 |
| EP | 2 551 482 B1 | 1/2015 |
| EP | 2 546 488 B1 | 4/2015 |
| EP | 2 551 481 B1 | 8/2015 |
| EP | 3 085 913 A1 | 10/2016 |
| EP | 3 085 915 A1 | 10/2016 |
| EP | 3 085 916 A1 | 10/2016 |
| EP | 2 570 178 B1 | 4/2017 |
| EP | 2 522 822 B1 | 6/2017 |
| EP | 2 796 684 B1 | 1/2018 |
| EP | 3 425 180 A1 | 1/2019 |
| EP | 3 699 407 A1 | 8/2020 |
| EP | 3 775 514 A1 | 2/2021 |
| FR | 2965011 A1 | 3/2012 |
| FR | 3010134 A1 | 3/2015 |
| FR | 2984953 B1 | 4/2015 |
| FR | 2977913 B1 | 6/2015 |
| FR | 3020835 A1 | 11/2015 |
| FR | 3020834 B1 | 6/2016 |
| FR | 3020835 B1 | 6/2016 |
| FR | 3098854 B1 | 7/2021 |
| FR | 3097775 B1 | 5/2022 |
| FR | 3102683 B1 | 6/2022 |
| FR | 3111664 B1 | 7/2022 |
| FR | 3110634 B1 | 9/2022 |
| GB | 2 385 545 A | 8/2003 |
| GB | 2 558 311 A | 7/2018 |
| IN | 201921025624 A | 1/2021 |
| JP | 2003-056274 A | 2/2003 |
| JP | 2009-156077 A | 7/2009 |
| JP | 2010-180863 A | 8/2010 |
| JP | 2013-133774 A | 7/2013 |
| WO | WO-2009/024815 A2 | 2/2009 |
| WO | WO-2009/024815 A3 | 2/2009 |
| WO | WO-2010/146285 A1 | 12/2010 |
| WO | WO-2011/110885 A1 | 9/2011 |
| WO | WO-2012/110720 A1 | 8/2012 |
| WO | WO-2012/123660 A1 | 9/2012 |
| WO | WO-2016/082850 A1 | 6/2016 |
| WO | WO-2016/111701 A1 | 7/2016 |
| WO | WO-2018/017164 A1 | 1/2018 |
| WO | WO-2018/075061 A1 | 4/2018 |
| WO | WO-2018/226626 A1 | 12/2018 |
| WO | WO-2019/029880 A1 | 2/2019 |
| WO | WO-2019/143373 A1 | 7/2019 |
| WO | WO-2020/009713 A1 | 1/2020 |
| WO | WO-2021/050819 A1 | 3/2021 |
| WO | WO-2021/112826 A1 | 6/2021 |
| WO | WO-2021/113246 A1 | 6/2021 |
| WO | WO-2021/173357 A1 | 9/2021 |
| WO | WO-2021/225824 A1 | 11/2021 |

OTHER PUBLICATIONS

Non-Final Office Action issued for U.S. Appl. No. 17/802,494 issued May 20, 2024.
Coanda effect, https://en.wikipedia.org/w/index.php?title=Coand%C4%83_effect&oldid=1000333406 (last visited Mar. 12, 2021).
Combined Search and Examination Report issued for GB2205057.9, issued May 5, 2022, 6 pages.
Examination Report for U.K. Patent Application No. 1413056.1 issued Sep. 21, 2017, 5 pages.
Examination Report for U.K. Patent Application No. 1805598.8 issued Apr. 24, 2018, 4 pages.
Examination Report in UK Patent Application No. GB2305850.6 issued May 26, 2023.
Examination Report issued for UK Patent Application No. GB 1917608.0 issued Sep. 6, 2021, 3 pages.
Examination Report issued in UK Patent Application No. GB2117927.0 issued Jan. 19, 2022.
Extended European Search Report in European Patent Application No. 19955166.4 dated Jul. 10, 2023.
Final Office Action in U.S. Appl. No. 17/695,580 issued Feb. 6, 2023.
Final US Office Action issued for U.S. Appl. No. 13/837,446 issued Jan. 5, 2015, 25 pages.
First Examination Report in Indian Patent Application No. 201947050068, issued Jan. 13, 2021.
First Examination Report in Indian Patent Application No. IN 202247030005, issued Jul. 13, 2022.
First Examination Report on Indian Patent Application No. 202147057999, issued Mar. 14, 2022.
First Office Action issued for Chinese Patent Application No. 201880001223.6, issued Dec. 17, 2020, 9 pages.
First Office Action in Chinese Patent Application No. 2019800973685, issued Mar. 8, 2022.
G. Comes, "Theoretical Modeling, Design and Simulation of an Innovative Diverting Valve Based on Coanda Effect", Fluids 2018, 3, 103, (2018).
Office Action in Chinese Patent Application No. CN 201880001223.6 issued Jul. 30, 2021.
Office Action issued for German Patent Application No. 11 2021 005 606.9 issued Dec. 14, 2023.
Office Action issued for Indian Patent Application No. IN 201947050068 issued Jan. 13, 2021.
Office Action in Germain Patent Application No. DE 446, issued Jan. 24, 2022.
International Search Report and Written Opinion in PCT Application No. PCT/US2022/038268 issued Oct. 26, 2022.
International Search Report & Written Opinion for PCT/US2012/022582 dated Oct. 25, 2012, 6 pages.
International Search Report and Written Opinion for International Patent Application No. PCT/US2020/062718 issued Feb. 19, 2021.
International Search Report and Written Opinion for PCT Application No. PCT/IB2019/054988 issued Jan. 29, 2020, 12 pages.
International search report and written opinion for PCT Application No. PCT/US 2020/050318 issued Dec. 8, 2020.
International Search Report and Written Opinion issued for PCT Application No. PCT/US2021/017551 issued Apr. 28, 2021,8 pages.
International Search Report and Written Opinion issued for PCT/US2022/014781 issued Apr. 25, 2022, 14 pages.
International Search Report and Writtin Opinion issued for PCT Application No. PCT/US2021/029282 issued Jul. 27, 2021, 9 pages.
International Search Report from corresponding PCT Application No. PCT/US2018/035959, dated Oct. 19, 2018, pp. 1-4.
Non-Final Office Action in U.S. Appl. No. 15/657,941 issued Aug. 6, 2019.
Non-Final Office Action in U.S. Appl. No. 16/618,716 issued Feb. 23, 2021.
Non-Final Office Action in U.S. Appl. No. 17/400,567 issued May 23, 2022.
Non-Final Office Action in U.S. Appl. No. 17/695,580 issued Jul. 27, 2022.
Non-Final Office Action in U.S. Appl. No. 17/923,804 issued Mar. 16, 2023.
Non-Final Office Action in U.S. Appl. No. 18/033,021 issued Jul. 18, 2023.
Non-Final Office Action in U.S. Appl. No. 18/071,189 issued Jul. 10, 2023.
Non-Final Office Action in US Design U.S. Appl. No. 29/835,755 issued Oct. 4, 2023.
Non-Final Office Action in US Design U.S. Appl. No. 29/835,777 issued Oct. 4, 2023.
Notice of Allowance in U.S. Appl. No. 16/442,014 issued Nov. 14, 2019.
Notice on Publication and Entering into Substantive Examination Procedure for Chinese Patent App. No. 201880001223.6 dated Mar. 13, 2019, 2 pages (with translation).
Office Action in Chinese Patent Application No. 2021800162220 issued Mar. 17, 2023.
Office Action in Chinese Patent Application No. 202180064965.5 issued Sep. 13, 2023.
Office Action in Chinese Patent Application No. 202210283795.6, dated Mar. 20, 2023.

(56) References Cited

OTHER PUBLICATIONS

Office Action issued for German Patent Application No. DE 11 2012 005 741.4 issued Dec. 7, 2022, 9 pages, included translation.
Preliminary Office Action on BR1120190253246, dated Apr. 26, 2022 (4 pages).
Search and Examination Report issued on GB2116026.2 issued Dec. 20, 2021, 3 pages.
Search Report and Written Opinion issued for PCT Application No. PCT/US2019/064232 issued Feb. 12, 2020, 13 pages.
Search Report issued for UK Patent Application No. GB 2101393.3, issued Feb. 22, 2021, 2 pages.
Search Report Letter issued for UK Patent Application No. GB 2101393.3, issued Feb. 22, 2021, 2 pages.
US Office Action issue for U.S. Appl. No. 13/837,446 issued Aug. 29, 2014, 29 pages.
US Office Action in U.S. Appl. No. 14/372,810 issued Mar. 8, 2017.
US Office Action in U.S. Appl. No. 14/372,810 issued May 25, 2016.
US Office Action in U.S. Appl. No. 16/618,716 issued Jan. 4, 2021.
Written Opinion from corresponding PCT Application No. PCT/US2018/035959, dated Oct. 19, 2018, pp. 1-8.

\* cited by examiner

EXHAUST GAS AFTERTREATMENT SYSTEM

CROSS-REFERENCE TO RELATED PATENT APPLICATIONS

The present application is a National Stage of PCT Application No. PCT/US2022/038268, filed on Jul. 26, 2022, which is related and claims the benefit of and priority to U.S. Provisional Patent Application No. 63/226,092, filed Jul. 27, 2021. The contents of these applications are incorporated herein by reference in their entirety and for all purposes.

TECHNICAL FIELD

The present disclosure relates generally to an exhaust gas aftertreatment system for an internal combustion engine.

BACKGROUND

For an internal combustion engine system, it may be desirable to treat exhaust gas produced by a combustion of fuel by an internal combustion engine. The exhaust gas can be treated using an aftertreatment system. One approach that can be implemented in an aftertreatment system is to dose the exhaust gas with a reductant and pass the exhaust gas and reductant through a catalyst member. It may desirable to cause the exhaust gas and the reductant to swirl upstream of the catalyst member so as to increase mixing of the exhaust gas and the reductant. However, this swirling may not be capable of independently facilitating desirable mixing the exhaust gas and the reductant in some applications.

SUMMARY

In one embodiment, an exhaust gas aftertreatment system includes an introduction conduit, a dosing module, a mixer, and an outlet flange. The introduction conduit is centered on a conduit center axis. The dosing module is coupled to the introduction conduit and includes an injector. The injector is configured to provide a treatment fluid into the introduction conduit and is defined by an injection axis. The mixer is disposed within the introduction conduit and includes a mixer body. The mixer body is configured to receive exhaust gas and the treatment fluid. The outlet flange includes an outlet flange body, an outlet flange opening, and a plurality of outlet flange perforations. The outlet flange body is centered on an outlet flange center axis. The outlet flange body includes an outlet flange body inner portion and an outlet flange body outer portion. The outlet flange body inner portion is coupled to the mixer body. The outlet flange body outer portion is coupled to the introduction conduit, separating the outlet flange body inner portion from the introduction conduit, and extending at an outlet flange angle away from the outlet flange body inner portion and downstream of the mixer. The outlet flange angle is obtuse. The outlet flange opening extends through the outlet flange body inner portion. The outlet flange perforations extend through the outlet flange body outer portion and are arrayed circumferentially around a portion of the outlet flange opening.

In another embodiment, an exhaust gas aftertreatment system includes an introduction conduit, a dosing module, a mixer, and a perforated dividing plate. The introduction conduit is centered on a conduit center axis. The dosing module is coupled to the introduction conduit and includes an injector that is configured to provide a treatment fluid into the introduction conduit and that is defined by an injection axis. The mixer is disposed within the introduction conduit and includes a mixer body that is configured to receive exhaust gas and the treatment fluid. The perforated dividing plate is coupled to the introduction conduit. The perforated dividing plate includes a perforated dividing plate body and a plurality of perforated dividing plate perforations. The perforated dividing plate body is coupled to the introduction conduit. The perforated dividing plate is centered on a perforated dividing plate transverse axis. The plurality of perforated dividing plate perforations extend through the perforated dividing plate body, disposed circumferentially along the perforated dividing plate body, and defined by a perforated area. The perforated area is defined by a shape and is centered on a perforated area transverse axis that is offset from the perforated dividing plate transverse axis.

In yet another embodiment, an exhaust gas aftertreatment system includes an introduction conduit, a dosing module, a mixer, and a partitioning plate. The introduction conduit is centered on a conduit center axis. The dosing module is coupled to the introduction conduit and includes an injector that is configured to provide a treatment fluid into the introduction conduit and that is defined by an injection axis. The mixer is disposed within the introduction conduit and includes a mixer body that is configured to receive exhaust gas and the treatment fluid. The partitioning plate is coupled to the mixer body. The partitioning plate includes a partitioning plate body and a partitioning plate opening. The partitioning plate body is coupled to the mixer body. The partitioning plate body is centered on a partitioning plate transverse axis. The partitioning plate opening extends through the partitioning plate body. The partitioning plate opening is centered on a partitioning plate opening center axis that is offset from the partitioning plate transverse axis.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
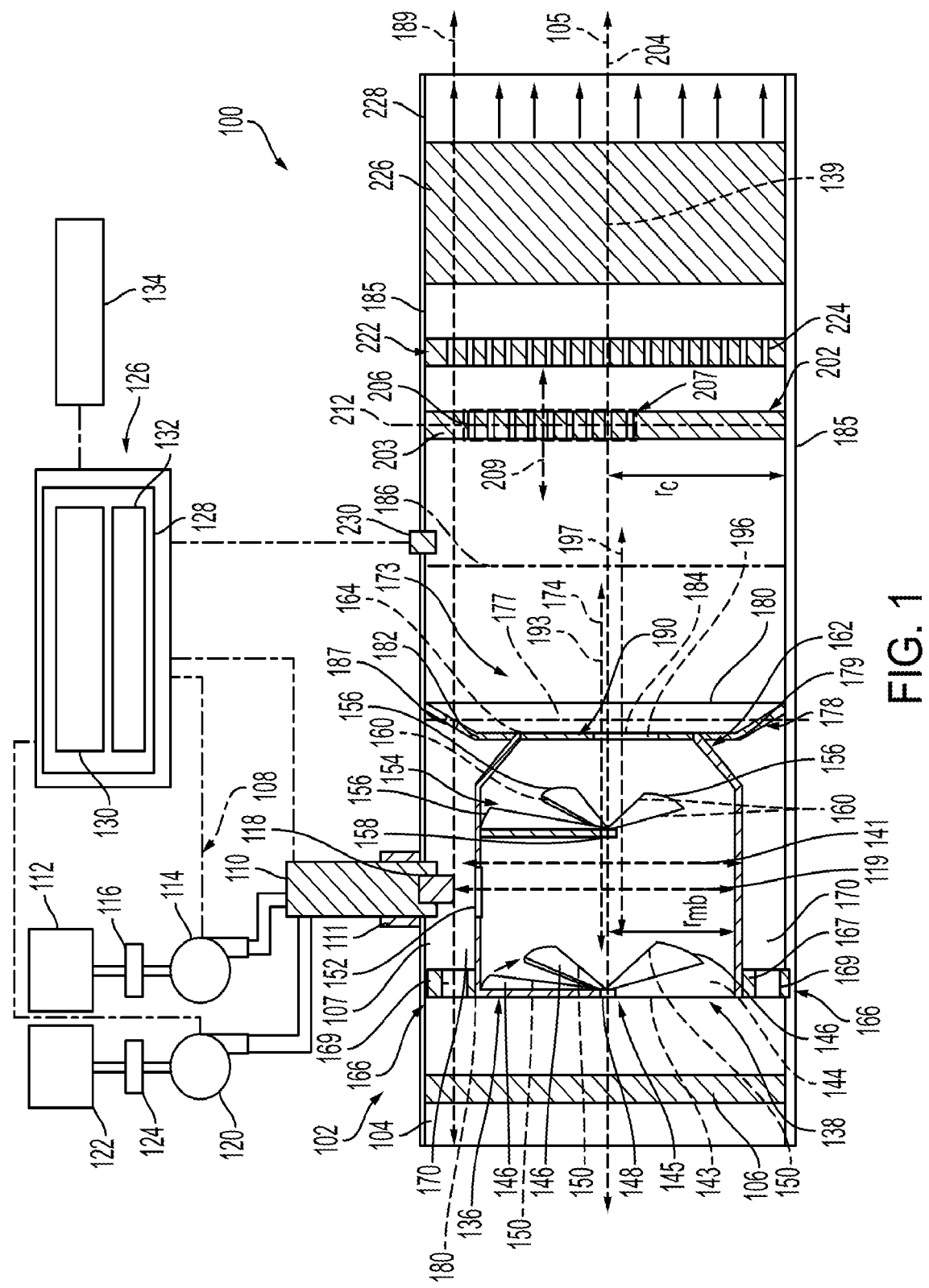
FIG. 1 is a cross-sectional view of a portion of an example exhaust gas aftertreatment system including an outlet flange.
Figure 2:
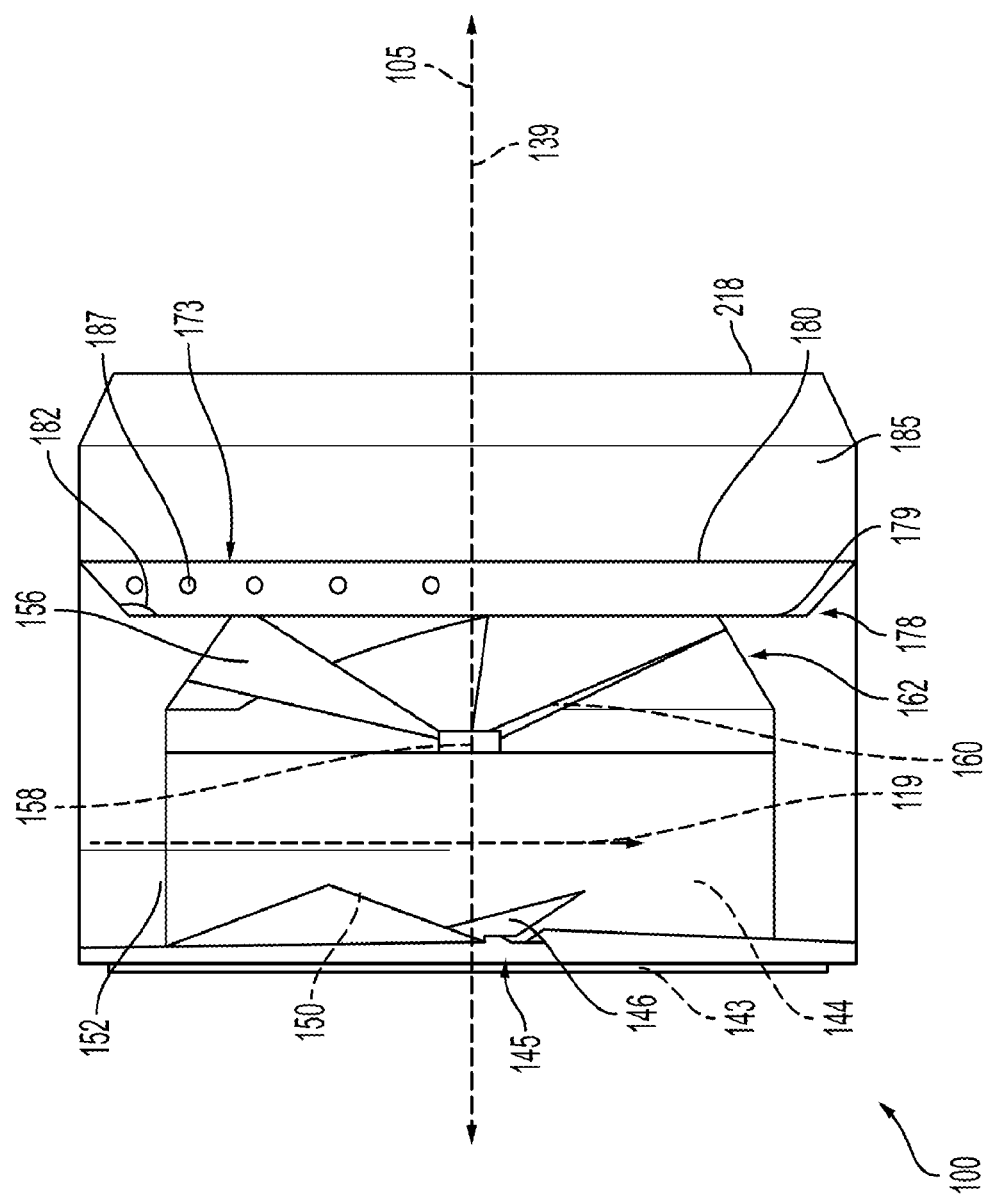
FIG. 2 is a cross-sectional view of a portion of the exhaust gas aftertreatment system of FIG. 1, in some embodiments.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, for treating exhaust gas of an internal combustion engine with an exhaust gas aftertreatment system (or simply "aftertreatment system"). The various concepts introduced above and discussed in greater detail below may be implemented in any of a number of ways, as the described concepts are not limited to any particular manner of implementation. Examples of specific implementations and applications are provided primarily for illustrative purposes.

I. Overview

In order to reduce emissions, it may be desirable to treat exhaust gas using an aftertreatment system that includes at least one aftertreatment component. This may be done using a treatment fluid and a catalyst member. Treatment of the exhaust gas may be enhanced by increasing a uniformity of distribution of the treatment fluid in the exhaust gas across an inlet face of the catalyst member. This uniformity of distribution is also referred to as a uniformity index.

Various devices may be used in order to increase the uniformity of distribution of the treatment fluid in the exhaust gas. For example, a device may be used to cause swirling of the exhaust gas, and this swirling cause dispersal of the treatment fluid in the exhaust gas. However, it may be possible to further increase the uniformity of distribution of the treatment fluid in the exhaust gas by providing additional mechanisms for causing dispersal of the treatment fluid in the exhaust gas.

Implementations herein are directed to an aftertreatment system that includes an outlet flange coupled to a mixer. The outlet flange includes an outlet flange opening through which the exhaust gas may pass and a plurality of perforations arrayed circumferentially around a portion of the outlet flange opening. As exhaust gas enters the aftertreatment system, the exhaust gas may flow into the mixer or into a secondary flow conduit. The exhaust gas within the mixer may receive a treatment fluid and the treatment fluid and exhaust gas flow through the outlet flange opening to a transfer conduit. The exhaust gas in the secondary flow conduit flows through the plurality of perforations to mix with the exhaust gas and treatment fluid in the transfer conduit to cause additional mixing of the treatment fluid reducing localized concentration within the exhaust gas.

II. Overview of Aftertreatment Systems

FIGS. 1-9 depict an exhaust gas aftertreatment system 100 (e.g., treatment system, etc.) for treating exhaust gas produced by an internal combustion engine (e.g., diesel internal combustion engine, gasoline internal combustion engine, hybrid internal combustion engine, propane internal combustion engine, dual-fuel internal combustion engine, etc.). As is explained in more detail herein, the exhaust gas aftertreatment system 100 is configured to facilitate treatment of the exhaust gas. This treatment may facilitate reduction of emission of undesirable components (e.g., nitrogen oxides ($NO_x$), etc.) in the exhaust gas.

The exhaust gas aftertreatment system 100 includes an exhaust gas conduit system 102 (e.g., line system, pipe system, etc.). The exhaust gas conduit system 102 is configured to facilitate routing of the exhaust gas produced by the internal combustion engine throughout the exhaust gas aftertreatment system 100 and to atmosphere (e.g., ambient environment, etc.).

The exhaust gas conduit system 102 includes an inlet conduit 104 (e.g., line, pipe, etc.). The inlet conduit 104 is fluidly coupled to an upstream component (e.g., header on the internal combustion engine, exhaust manifold on the internal combustion engine, the internal combustion engine, etc.) and is configured to receive exhaust gas from the upstream component. In some embodiments, the inlet conduit 104 is coupled (e.g., attached, fixed, welded, fastened, riveted, adhesively attached, bonded, pinned, etc.) to the upstream component. In other embodiments, the inlet conduit 104 is integrally formed with the upstream component. As utilized herein, two or more elements are "integrally formed" with each when the two or more elements are formed and joined together as part of a single manufacturing process to create a single-piece or unitary construction that cannot be disassembled without an at least partial destruction of the overall component. The inlet conduit 104 is centered on a conduit center axis 105 (e.g., the conduit center axis 105 extends through a center point of the inlet conduit 104, etc.). As used herein, the term "axis" describes a theoretical line extending through the centroid (e.g., center of mass, etc.) of an object. The object is centered on this axis. The object is not necessarily cylindrical (e.g., a non-cylindrical shape may be centered on an axis, etc.).

The exhaust gas aftertreatment system 100 also includes a filter 106 (e.g., diesel particulate filter (DPF), filtration member, etc.). The filter 106 is disposed within the inlet conduit 104 and is configured to remove particulates from the exhaust gas. For example, the filter 106 may receive exhaust gas (e.g., from the inlet conduit 104, etc.) having a first concentration of the particulates and may provide the exhaust gas (e.g., to the inlet conduit 104, etc.) having a second concentration of the particulates, where the second concentration is lower than the first concentration. In some embodiments, the exhaust gas aftertreatment system 100 does not include the filter 106. In some embodiments, the exhaust gas aftertreatment system 100 also includes a diesel oxidation catalyst (DOC) that is placed upstream of the filter 106.

The exhaust gas conduit system 102 also includes an introduction conduit 107 (e.g., decomposition housing, decomposition reactor, decomposition chamber, reactor pipe, decomposition tube, reactor tube, etc.). The introduction conduit 107 is fluidly coupled to the inlet conduit 104 and is configured to receive exhaust gas from the inlet conduit 104 (e.g., after flowing through the filter 106). In various embodiments, the introduction conduit 107 is coupled to the inlet conduit 104. For example, the introduction conduit 107 may be fastened (e.g., using a band, using bolts, using twist-lock fasteners, threaded, etc.), welded, riveted, or otherwise attached to the inlet conduit 104. In other embodiments, the introduction conduit 107 is integrally formed with the inlet conduit 104. As utilized herein, the terms "fastened," "fastening," and the like, describe attachment (e.g., joining, etc.) of two structures in such a way that detachment (e.g., separation, etc.) of the two structures remains possible while "fastened" or after the "fastening" is completed, without destroying or damaging either or both of the two structures. In some embodiments, the inlet conduit 104 is the introduction conduit 107 (e.g., only the inlet conduit 104 is included in the exhaust gas conduit system 102 and the inlet conduit 104 functions as both the inlet conduit 104 and the introduction conduit 107). The introduction conduit 107 is centered on the conduit center axis 105 (e.g., the conduit center axis 105 extends through a center point of the introduction conduit 107, etc.). The introduction conduit 107 has a conduit radius, $r_c$. The conduit radius $r_c$ may be selected so as to tailor the exhaust gas aftertreatment system 100 for a target application. As utilized herein, the term "radius" connotes a length of a chord extending from a center point of a shape (e.g., square, rectangle, hexagon, circle, pentagon, triangle, etc.) to an edge of the shape.

In various embodiments, the conduit radius $r_c$ may be approximately (e.g., within 5% of being, etc.) in a range of 1 inch to 10 inches, inclusive (e.g., 0.95 inches, 1 inch, 2 inches, 5 inches, 8 inches, 10 inches, 10.5 inches, etc.). For example, the conduit radius $r_c$ may be approximately equal to 4 inches. As used herein, a range of X to Y includes X, Y, values between X and Y, and values approximately equal to X and approximately equal to Y. In some applications, the conduit radius $r_c$ may be approximately equal to 12 inches.

The exhaust gas aftertreatment system 100 also includes a treatment fluid delivery system 108. As is explained in more detail herein, the treatment fluid delivery system 108 is configured to facilitate the introduction of a treatment fluid, such as a reductant (e.g., diesel exhaust fluid (DEF), Adblue®, a urea-water solution (UWS), an aqueous urea solution, AUS32, etc.), into the exhaust gas within the introduction conduit 107. When the reductant is introduced into the exhaust gas, reduction of emission of undesirable components in the exhaust gas using the exhaust gas aftertreatment system 100 may be facilitated.

The treatment fluid delivery system 108 includes a dosing module 110 (e.g., doser, reductant doser, etc.). The dosing module 110 is configured to facilitate passage of the treatment fluid through the introduction conduit 107 and into the introduction conduit 107.

The exhaust gas aftertreatment system 100 also includes a dosing module mount 111 (e.g., bracket, coupling, etc.). The dosing module mount 111 is configured to facilitate mounting of the dosing module 110 to the introduction conduit 107. In some embodiments, the dosing module mount 111 is integrally formed with the dosing module 110. In other embodiments, the dosing module mount 111 is coupled to the dosing module 110. Similarly, the dosing module mount 111 may be coupled to the introduction conduit 107, in some applications. In other applications, the dosing module mount 111 may be integrally formed with the introduction conduit 107. In various embodiments, the dosing module 110 is coupled to the dosing module mount 111 and the dosing module mount 111 is coupled to the introduction conduit 107. The dosing module 110 is coupled to the introduction conduit 107 via the dosing module mount 111.

The dosing module mount 111 may provide insulation (e.g., thermal insulation, vibrational insulation, etc.) between the dosing module 110 and the introduction conduit 107. In some embodiments, the exhaust gas aftertreatment system 100 includes an insulator. The insulator may be the dosing module 110 and the dosing module mount 111 and/or between the dosing module mount 111 and the introduction conduit 107.

The treatment fluid delivery system 108 also includes a treatment fluid source 112 (e.g., reductant tank, etc.). The treatment fluid source 112 is configured to contain the treatment fluid. The treatment fluid source 112 is fluidly coupled to the dosing module 110 and configured to provide the treatment fluid to the dosing module 110. The treatment fluid source 112 may include multiple treatment fluid sources 112 (e.g., multiple tanks connected in series or in parallel, etc.). The treatment fluid source 112 may be, for example, a diesel exhaust fluid tank containing Adblue®.

The treatment fluid delivery system 108 also includes a treatment fluid pump 114 (e.g., supply unit, etc.). The treatment fluid pump 114 is fluidly coupled to the treatment fluid source 112 and the dosing module 110 and configured to receive the treatment fluid from the treatment fluid source 112 and to provide the treatment fluid to the dosing module 110. The treatment fluid pump 114 is used to pressurize the treatment fluid from the treatment fluid source 112 for delivery to the dosing module 110. In some embodiments, the treatment fluid pump 114 is pressure controlled. In some embodiments, the treatment fluid pump 114 is coupled to a chassis of a vehicle associated with the exhaust gas aftertreatment system 100.

In some embodiments, the treatment fluid delivery system 108 also includes a treatment fluid filter 116. The treatment fluid filter 116 is fluidly coupled to the treatment fluid source 112 and the treatment fluid pump 114 and is configured to receive the treatment fluid from the treatment fluid source 112 and to provide the treatment fluid to the treatment fluid pump 114. The treatment fluid filter 116 filters the treatment fluid prior to the treatment fluid being provided to internal components of the treatment fluid pump 114. For example, the treatment fluid filter 116 may inhibit or prevent the transmission of solids to the internal components of the treatment fluid pump 114. In this way, the treatment fluid filter 116 may facilitate prolonged desirable operation of the treatment fluid pump 114.

The dosing module 110 includes at least one injector 118 (e.g., insertion device, etc.). The injector 118 is fluidly coupled to the treatment fluid pump 114 and configured to receive the treatment fluid from the treatment fluid pump 114. The injector 118 is configured to dose (e.g., provide, inject, insert, etc.) the treatment fluid received by the dosing module 110 into the exhaust gas within the introduction conduit 107 and along an injection axis 119 (e.g., within a spray cone that is centered on the injection axis 119, etc.). In some embodiments, the injector 118 may dose the injection fluid in a spray that occurs over an angular range approximately in a range of 5° to 60° (e.g., 4.75°, 5°, 10°, 15°, 20°, 25°, 30°, 35°, 40°, 45°, 50°, 55°, 60°, 63°, etc.), where the angular range is centered on the injection axis 119.

In some embodiments, the treatment fluid delivery system 108 also includes an air pump 120 and an air source 122 (e.g., air intake, etc.). The air pump 120 is fluidly coupled to the air source 122 and is configured to receive air from the air source 122. The air pump 120 is fluidly coupled to the dosing module 110 and is configured to provide the air to the dosing module 110. In some applications, the dosing module 110 is configured to mix the air and the treatment fluid into an air-treatment fluid mixture and to provide the air-treatment fluid mixture to the injector 118 (e.g., for dosing into the exhaust gas within the introduction conduit 107, etc.). As used herein, it is understood that a treatment fluid may include or consistent of an air-treatment fluid mixture.

The injector 118 is fluidly coupled to the air pump 120 and configured to receive the air from the air pump 120. The injector 118 is configured to dose the treatment fluid into the exhaust gas within the introduction conduit 107. In some of these embodiments, the treatment fluid delivery system 108 also includes an air filter 124. The air filter 124 is fluidly coupled to the air source 122 and the air pump 120 and is configured to receive the air from the air source 122 and to provide the air to the air pump 120. The air filter 124 is configured to filter the air prior to the air being provided to the air pump 120. In other embodiments, the treatment fluid delivery system 108 does not include the air pump 120 and/or the treatment fluid delivery system 108 does not include the air source 122. In such embodiments, the dosing module 110 is not configured to mix the treatment fluid with the air.

In various embodiments, the dosing module 110 is configured to receive air and fluid, and doses the treatment fluid into the introduction conduit 107. In various embodiments, the dosing module 110 is configured to receive treatment fluid (and does not receive air), and doses the treatment fluid into the introduction conduit 107. In various embodiments, the dosing module 110 is configured to receive treatment fluid, and doses the treatment fluid into the introduction conduit 107. In various embodiments, the dosing module 110 is configured to receive air and treatment fluid, and doses the treatment fluid into the introduction conduit 107.

The exhaust gas aftertreatment system 100 also includes a controller 126 (e.g., control circuit, driver, etc.). The dosing module 110, the treatment fluid pump 114, and the air pump 120 are also electrically or communicatively coupled to the controller 126. The controller 126 is configured to control the dosing module 110 to dose the treatment fluid into the introduction conduit 107. The controller 126 may also be configured to control the treatment fluid pump 114 and/or the air pump 120 in order to control the treatment fluid that is dosed into the introduction conduit 107.

The controller 126 includes a processing circuit 128. The processing circuit 128 includes a processor 130 and a memory 132. The processor 130 may include a microprocessor, an application-specific integrated circuit (ASIC), a field-programmable gate array (FPGA), etc., or combinations thereof. The memory 132 may include, but is not limited to, electronic, optical, magnetic, or any other storage or transmission device capable of providing a processor, ASIC, FPGA, etc. with program instructions. This memory 132 may include a memory chip, Electrically Erasable Programmable Read-Only Memory (EEPROM), Erasable Programmable Read Only Memory (EPROM), flash memory, or any other suitable memory from which the controller 126 can read instructions. The instructions may include code from any suitable programming language. The memory 132 may include various modules that include instructions that are configured to be implemented by the processor 130.

In various embodiments, the controller 126 is configured to communicate with a central controller 134 (e.g., engine control unit (ECU), engine control module (ECM), etc.) of an internal combustion engine having the exhaust gas aftertreatment system 100. In some embodiments, the central controller 134 and the controller 126 are integrated into a single controller.

In some embodiments, the central controller 134 is communicable with a display device (e.g., screen, monitor, touch screen, heads up display (HUD), indicator light, etc.). The display device may be configured to change state in response to receiving information from the central controller 134. For example, the display device may be configured to change between a static state and an alarm state based on a communication from the central controller 134. By changing state, the display device may provide an indication to a user of a status of the treatment fluid delivery system 108.

The exhaust gas aftertreatment system 100 also includes a mixer 136 (e.g., a swirl generating device, etc.). At least a portion of the mixer 136 is positioned within the introduction conduit 107. In some embodiments, a first portion of the mixer 136 is positioned within the inlet conduit 104 and a second portion of the mixer 136 is positioned within the introduction conduit 107.

The mixer 136 receives the exhaust gas from the inlet conduit 104 (e.g., via the introduction conduit 107, etc.). The mixer 136 also receives the treatment fluid from the injector 118. The mixer 136 is configured to mix the treatment fluid with the exhaust gas. The mixer 136 is also configured to facilitate swirling (e.g., rotation, etc.) of the exhaust gas and mixing (e.g., combination, etc.) of the exhaust gas and the treatment fluid so as to disperse the treatment fluid within the exhaust gas downstream of the mixer 136 (e.g., to obtain an increased uniformity index, etc.). By dispersing the treatment fluid within the exhaust gas using the mixer 136, reduction of emission of undesirable components in the exhaust gas is enhanced and/or an ability of the exhaust gas aftertreatment system 100 to increase a temperature of the exhaust gas may be enhanced.

The mixer 136 includes a mixer body 138 (e.g., shell, frame, etc.). The mixer body 138 is supported within the inlet conduit 104 and/or the introduction conduit 107. The mixer body 138 is centered on a mixer body center axis 139. In various embodiments, the mixer body center axis 139 is the same as the conduit center axis 105 (e.g., the mixer body center axis 139 extends along the conduit center axis 105, etc.). In other embodiments, at least a portion of the mixer body center axis 139 is separated from the conduit center axis 105. For example, the mixer body center axis 139 may be parallel to the conduit center axis 105 and offset from the conduit center axis 105.

The mixer body 138 is defined by a mixer body radius $r_{mb}$ from the mixer body center axis 139. The mixer body radius $r_{mb}$ may be selected based on the conduit radius $r_c$. For example, the mixer body 138 may be configured such that $$0.30 r_c \leq r_{mb} \leq 0.90 r_c \tag{1}$$

the mixer body radius $r_{mb}$ is each approximately in a range of $0.30 r_c$ to $0.90 r_c$, inclusive (e.g., $0.285 r_c$, $0.30 r_c$, $0.40 r_c$, $0.55 r_c$, $0.60 r_c$, $0.70 r_c$, $0.80 r_c$, $0.90 r_c$, $0.99 r_c$, etc.).

In various embodiments, the mixer body radius $r_{mb}$ may be approximately in a range of 2 inches to 10 inches, inclusive (e.g., 2 inches, 3 inch, 6 inches, 8 inches, 10 inches, 10.5 inches, etc.). For example, the mixer body radius $r_{mb}$ may be approximately equal to 7 inches. In some applications, the mixer body radius $r_{mb}$ may be approximately equal to 16 inches.

The dosing module mount 111 facilitates orientation of the injector 118 such that the injection axis 119 is desirably oriented within the mixer body 138. The mixer body 138 has a mixer body lateral axis 140. The mixer body lateral axis 140 extends through the mixer body center axis 139 and is orthogonal to the mixer body center axis 139. The mixer body 138 also has a mixer body transverse axis 141. The mixer body transverse axis 141 extends through the mixer body center axis 139 and is orthogonal to the mixer body center axis 139. Additionally, the mixer body transverse axis 141 extends through the mixer body lateral axis 140 and is orthogonal to the mixer body lateral axis 140.

The mixer body lateral axis 140 and the mixer body transverse axis 141 extend along a mixer body plane 142 that is orthogonal to the mixer body center axis 139. The dosing module mount 111 is configured such that the injection axis 119 extends along the mixer body plane 142. In some embodiments, the dosing module mount 111 is configured such that the injection axis 119 is approximately orthogonal to the mixer body lateral axis 140, approximately parallel to the mixer body transverse axis 141, and separated from the mixer body transverse axis 141.

The mixer body 138 includes a mixer inlet 143 (e.g., inlet aperture, inlet opening, etc.). The mixer inlet 143 receives the exhaust gas (e.g., from the inlet conduit 104, etc.). The mixer body 138 defines (e.g., partially encloses, etc.) a mixer cavity 144 (e.g., void, etc.). The mixer cavity 144 receives the exhaust gas from the mixer inlet 143. As is explained in more detail herein, the exhaust gas is caused to swirl within the mixer body 138, and this swirling facilitates mixing of the exhaust gas and the treatment fluid.

The mixer 136 also includes an upstream vane plate 145 (e.g., upstream mixing element, mixing plate, etc.). The upstream vane plate 145 is coupled to the mixer body 138 and is disposed within the mixer cavity 144. In some embodiments, the upstream vane plate 145 is coupled to the mixer body 138 proximate the mixer inlet 143.

Figure 3:
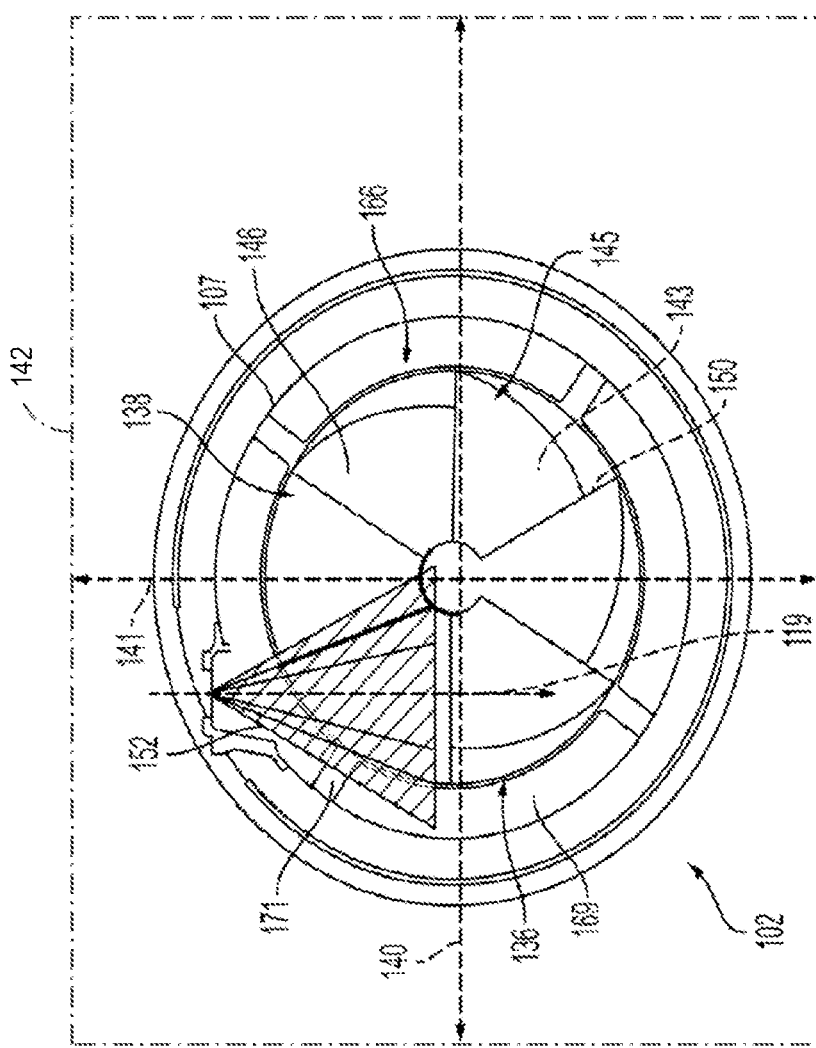
FIG. 3 is a cross-sectional view of a portion the exhaust gas aftertreatment system of FIG. 1 from downstream looking upstream.

The upstream vane plate 145 includes a plurality of upstream vanes 146 (e.g., plates, fins, etc.), as shown in FIG. 3 which is a top cross-sectional, perspective view of the mixer 136. Each of the upstream vanes 146 extends within the mixer cavity 144 so as to cause the exhaust gas to swirl within the mixer cavity 144 (e.g., downstream of the upstream vane plate 145, etc.). At least one of the upstream vanes 146 is coupled to the mixer body 138. For example, an edge of one of the upstream vanes 146 may be coupled to the mixer body 138 (e.g., using spot welds, etc.).

In various embodiments, each of the upstream vanes 146 is coupled to an upstream vane hub 148 (e.g., center post, etc.). For example, the upstream vanes 146 may be coupled to the upstream vane hub 148 such that the upstream vane plate 145 is rotationally symmetric about the upstream vane hub 148. In various embodiments, the upstream vane hub 148 is centered on the mixer body center axis 139 (e.g., the mixer body center axis 139 extends through a center point of the upstream vane hub 148, etc.).

The upstream vane plate 145 defines a plurality of upstream vane apertures 150 (e.g., windows, holes, etc.). Each of the upstream vane apertures 150 is located between two adjacent upstream vanes 146. For example, where the upstream vane plate 145 includes four upstream vanes 146, the upstream vane plate 145 includes four upstream vane apertures 150 (e.g., a first upstream vane aperture 150 between a first upstream vane 146 and a second upstream vane 146, a second upstream vane aperture 150 between the second upstream vane 146 and a third upstream vane 146, a third upstream vane aperture 150 between the third upstream vane 146 and a fourth upstream vane 146, and a fourth upstream vane aperture 150 between the fourth upstream vane 146 and the first upstream vane 146). In various embodiments, the upstream vane plate 145 includes the same number of upstream vanes 146 and upstream vane apertures 150.

The mixer body 138 also includes a treatment fluid inlet 152 (e.g., aperture, window, hole, etc.). The treatment fluid inlet 152 is aligned with the injector 118 and the mixer body 138 is configured to receive the treatment fluid through the treatment fluid inlet 152. The treatment fluid inlet 152 is disposed downstream of the upstream vane plate 145. As a result, the treatment fluid flows from the injector 118, between the mixer body 138 and the introduction conduit 107, through the mixer body 138 via the treatment fluid inlet 152, and into the mixer cavity 144 (e.g., downstream of the upstream vane plate 145, etc.). The injection axis 119 extends through the treatment fluid inlet 152.

As the exhaust gas flows from the upstream vanes 146 towards the downstream vane plate 154, as described herein, the treatment fluid is dispersed within the exhaust gas. The distribution of the treatment fluid within the exhaust gas can be quantified using a fluid dispersion uniformity. The fluid dispersion uniformity is a measurement of dispersion of the treatment fluid across the exhaust gas at a target location, such as the exhaust gas within the mixer cavity 144. Where the fluid dispersion uniformity is relatively large the treatment fluid is more evenly dispersed within the exhaust gas at the target location. However, where the fluid dispersion uniformity is relatively small portions of the exhaust gas may have undesirable concentrations of the treatment fluid. These portions of the exhaust gas may be diluted through various combinations of components of the exhaust gas aftertreatment system 100, as described herein. As used herein, dilution of a location refers to provision of additional exhaust gas to the location so as to decrease a relative concentration of the treatment fluid in the exhaust gas at the location. It may be desirable to perform dilution so as to cause the exhaust gas to have a target concentration at the location, which can enable the exhaust gas to have a target uniformity index.

The mixer 136 also includes a downstream vane plate 154 (e.g., downstream mixing element, mixing plate, etc.). The downstream vane plate 154 is coupled to the mixer body 138 and is disposed within the mixer cavity 144 downstream of the treatment fluid inlet 152. In various embodiments, the downstream vane plate 154 is coupled to the mixer body 138 downstream of the treatment fluid inlet 152 such that the treatment fluid inlet 152 is located between the upstream vane plate 145 and the downstream vane plate 154.

The downstream vane plate 154 includes a plurality of downstream vanes 156 (e.g., plates, fins, etc.). Each of the downstream vanes 156 extends within the mixer cavity 144 so as to cause the exhaust gas to swirl within the mixer cavity 144 (e.g., downstream of the downstream vane plate 154, etc.). At least one of the downstream vanes 156 is coupled to the mixer body 138. For example, an edge of one of the downstream vanes 156 may be coupled to the mixer body 138 (e.g., using spot welds, etc.).

The downstream vane plate 154 may include more, less, or the same number of downstream vanes 156 as the upstream vane plate 145 includes of the upstream vanes 146. For example, where the upstream vane plate 145 includes five upstream vanes 146, the downstream vane plate 154 may include three, four, five, six, or other numbers of the downstream vanes 156.

In various embodiments, each of the downstream vanes 156 is coupled to a downstream vane hub 158 (e.g., center post, etc.). For example, the downstream vanes 156 may be coupled to the downstream vane hub 158 such that the downstream vane plate 154 is rotationally symmetric about the downstream vane hub 158. In various embodiments, the downstream vane hub 158 is centered on the mixer body center axis 139 (e.g., the mixer body center axis 139 extends through a center point of the downstream vane hub 158, etc.). In some embodiments, the downstream vane hub 158 is centered on an axis that is different from an axis on which the upstream vane hub 148 is centered. For example, the downstream vane hub 158 may be centered on an axis that is approximately parallel to and separated from an axis on which the upstream vane hub 148 is centered.

The downstream vane plate 154 defines a plurality of downstream vane apertures 160 (e.g., windows, holes, etc.). Each of the downstream vane apertures 160 is located between two adjacent downstream vanes 156. For example, where the downstream vane plate 154 includes four downstream vanes 156, the downstream vane plate 154 includes four downstream vane apertures 160 (e.g., a first downstream vane aperture 160 between a first downstream vane 156 and a second downstream vane 156, a second downstream vane aperture 160 between the second downstream vane 156 and a third downstream vane 156, a third downstream vane aperture 160 between the third downstream vane 156 and a fourth downstream vane 156, and a fourth downstream vane aperture 160 between the fourth downstream vane 156 and the first downstream vane 156). In various embodiments, the downstream vane plate 154 includes the same number of downstream vanes 156 and downstream vane apertures 160.

In various embodiments, the mixer 136 also includes a shroud 162 (e.g., cover, etc.). The shroud 162 is contiguous with the mixer body 138 and extends from the mixer body 138 towards the mixer body center axis 139 and away from the upstream vane plate 145 and the downstream vane plate 154. The shroud 162 functions to funnel (e.g., concentrate, direct, etc.) the exhaust gas and the treatment fluid towards the mixer body center axis 139.

The shroud 162 includes a mixer outlet 164 (e.g., outlet aperture, outlet opening, etc.). The mixer outlet 164 provides the exhaust gas and the treatment fluid out of the shroud 162, and therefore out of the mixer body 138. Due to the upstream vane plate 145 and the downstream vane plate 154, the exhaust gas exiting the mixer outlet 164 is caused to swirl.

In various embodiment, the exhaust gas aftertreatment system 100 also includes an inlet flange 166 (e.g., panel, coupler, ring, etc.). The inlet flange 166 includes an inlet flange body 167. The inlet flange body 167 is coupled to the mixer body 138 proximate the mixer inlet 143. In various embodiments, the inlet flange body 167 is also coupled to the introduction conduit 107. The inlet flange 166 functions to separate the mixer body 138 from the introduction conduit 107 and support the mixer body 138 within the introduction conduit 107. The inlet flange body 167 includes an inlet flange opening 168. The inlet flange opening 168 extends through the inlet flange body 167 and facilitates flow of the exhaust gas from the introduction conduit 107 to the mixer inlet 143.

The inlet flange 166 includes a plurality of inlet flange apertures 169 (e.g., windows, holes, etc.). Each of the inlet flange apertures 169 extends through the inlet flange body 167. The inlet flange apertures 169 are arrayed (e.g., arranged, positioned, etc.) circumferentially around the inlet flange opening 168. Each of the inlet flange apertures 169 is configured to facilitate passage of the exhaust gas through the inlet flange body 167 to a passageway 170. The passageway 170 is positioned between the mixer body 138 and the introduction conduit 107 and configured to receive the exhaust gas flowing from the inlet flange apertures 169.

Figure 4:
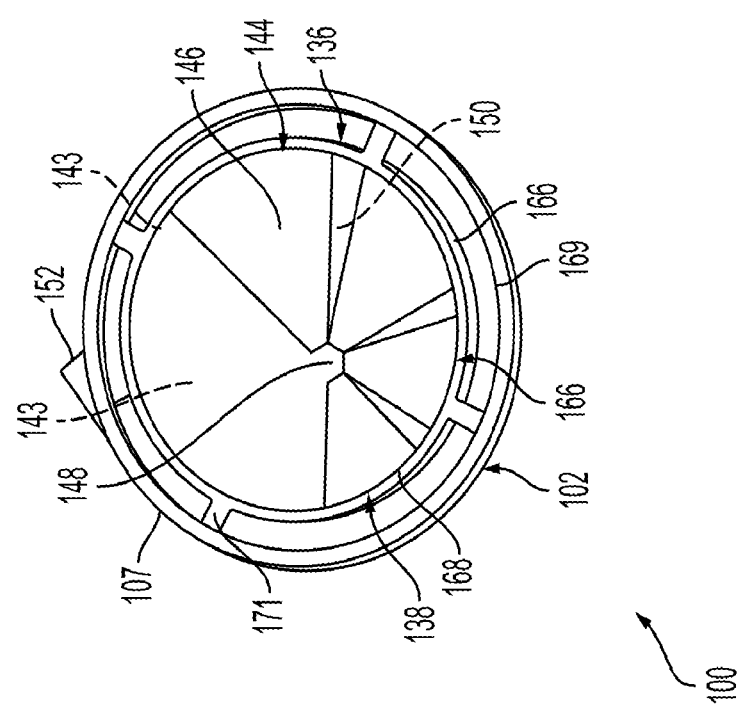
FIG. 4 is a cross-sectional view of a portion of the exhaust gas aftertreatment system of FIG. 1 from upstream looking downstream.
Figure 5:
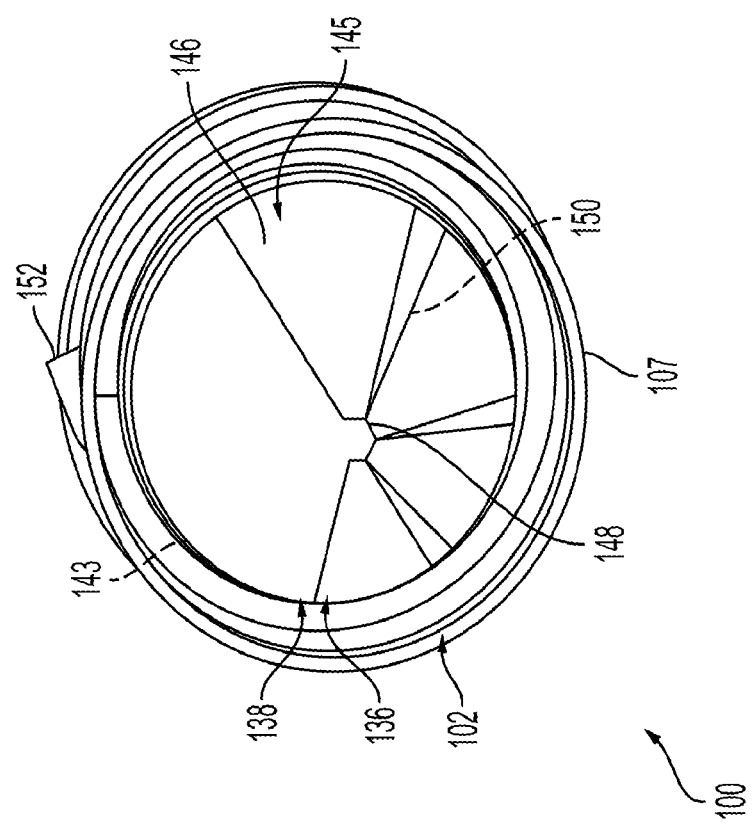
FIG. 5 is a cross-sectional, perspective view of a portion of the exhaust gas aftertreatment system of FIG. 1, from upstream looking downstream.

In various embodiments, such as shown in FIG. 4, the inlet flange 166 includes a plurality of inlet flange supports 171 (e.g., arms, bars, etc.). The inlet flange supports 171 are coupled to the inlet flange body 167 and are configured to couple the inlet flange 166 to the introduction conduit 107. In some embodiments, the inlet flange supports 171 may be integrally formed with the inlet flange body 167.

Each of the inlet flange supports 171 may define a portion of one of the inlet flange apertures 169. For example, where the inlet flange 166 includes four inlet flange supports 171, the inlet flange includes four inlet flange apertures 169 (e.g., a first inlet flange aperture 169 between a first inlet flange support 171 and a second inlet flange support 171, a second inlet flange aperture 169 between a second inlet flange support 171 and a third inlet flange support 171, a third inlet flange aperture 169 between a third inlet flange support 171 and a fourth inlet flange support 171, and a fourth inlet flange aperture 169 between a fourth inlet flange support 171 and a first inlet flange support 171).

In some applications, it may be desirable to alter (e.g., impede, prevent, facilitate, etc.) flow of the exhaust gas through various of the inlet flange apertures 169 into the passageway 170. As show in FIGS. 6-9, the inlet flange 166 may include at least one inlet flange panel 172. The inlet flange panel 172 is coupled to the inlet flange 166 around at least a portion of at least one of the inlet flange apertures 169 so as to cover (e.g., block, obstruct, etc.) flow of the exhaust gas into the at least one of the inlet flange apertures 169. In some embodiments, the inlet flange panel 172 is integrally formed with the inlet flange 166. In some embodiments, the inlet flange panel 172 is coupled to at least one of the inlet flange supports 171. By covering an inlet flange aperture 169, either partially or in its entirety, the inlet flange panel 172 alters the flow path of the exhaust gas.

Figure 6:
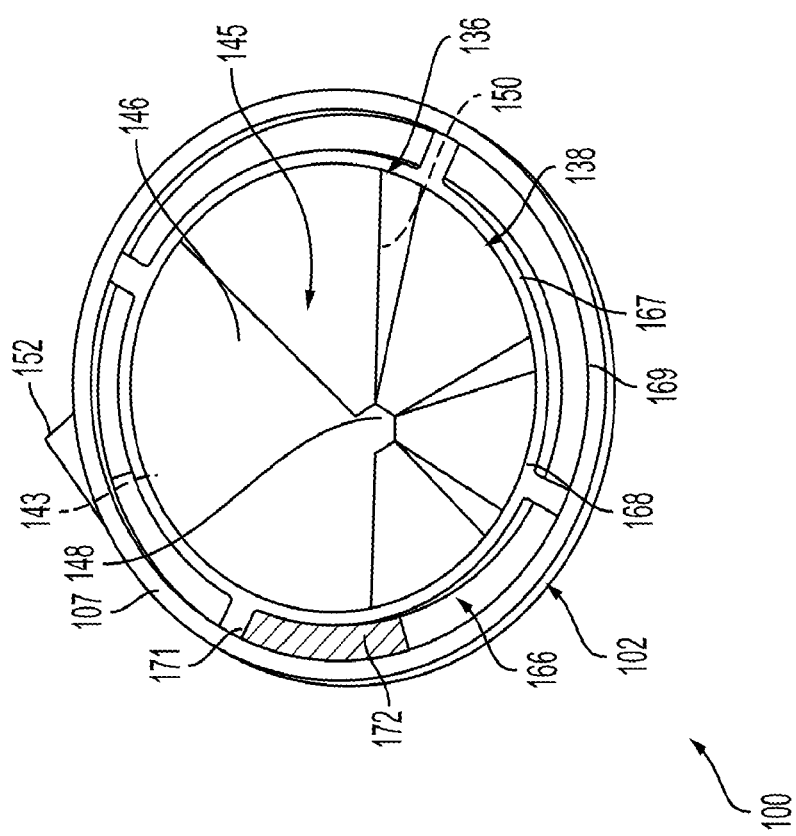
FIG. 6 is another cross-sectional view of a portion of the exhaust gas aftertreatment system of FIG. 4.

In various embodiments, the inlet flange panels 172 are strategically positioned so as to impede the flow of the exhaust gas at one location on the inlet flange 166 while facilitating flow of the exhaust gas at another location on the inlet flange 166. In some embodiments, as shown in FIG. 6, the inlet flange panel 172 may be coupled on one of the inlet flange supports 171, the inlet flange body 167, and the introduction conduit 107 so as to cover a portion of one of the inlet flange apertures 169. Here, the inlet flange panel 172 is configured to impede the flow to the portion of one of the inlet flange apertures 169 such that the inlet flange 166 may facilitate the impeded exhaust gas toward the inlet flange opening 168 and the adjacent inlet flange aperture 169.

Figure 7:
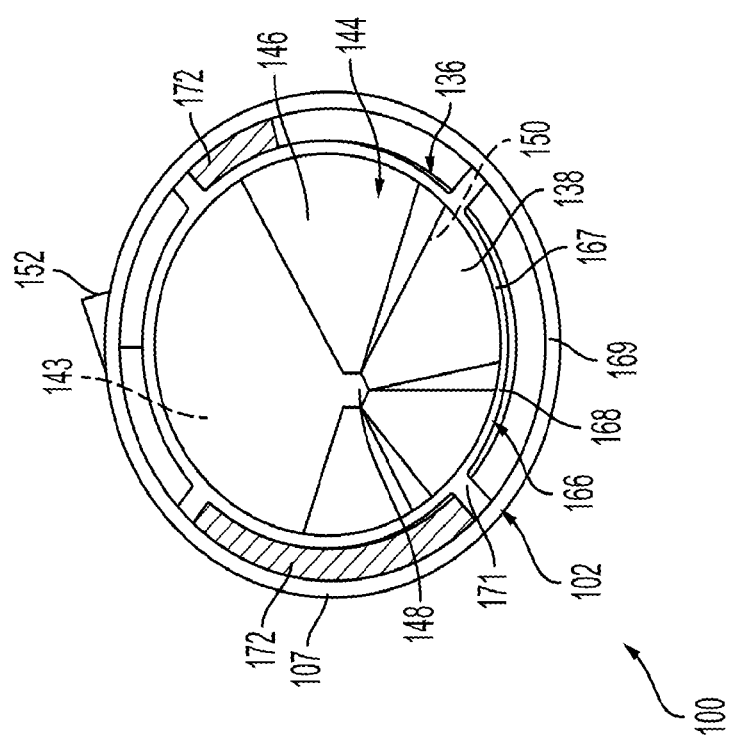
FIG. 7 is another cross-sectional view of a portion of the exhaust gas aftertreatment system of FIG. 4.

In some embodiments, as shown in FIG. 7, the first inlet flange panel 172 is coupled two of the inlet flange supports 171, the introduction conduit 107, and the inlet flange body 167 such that the one of the inlet flange apertures 169 is covered in its entirety. Further, a second inlet flange panel 172 is coupled to one of the inlet flange supports 171, the introduction conduit 107, and the inlet flange body 167 such that the second inlet flange panel 172 is opposite of the first inlet flange panel 172 and partially covers one of the inlet flange apertures 169. Here, the flow path of the exhaust gas is altered substantially towards the adjacent inlet flange apertures 169 and the inlet flange opening 168.

Figure 8:
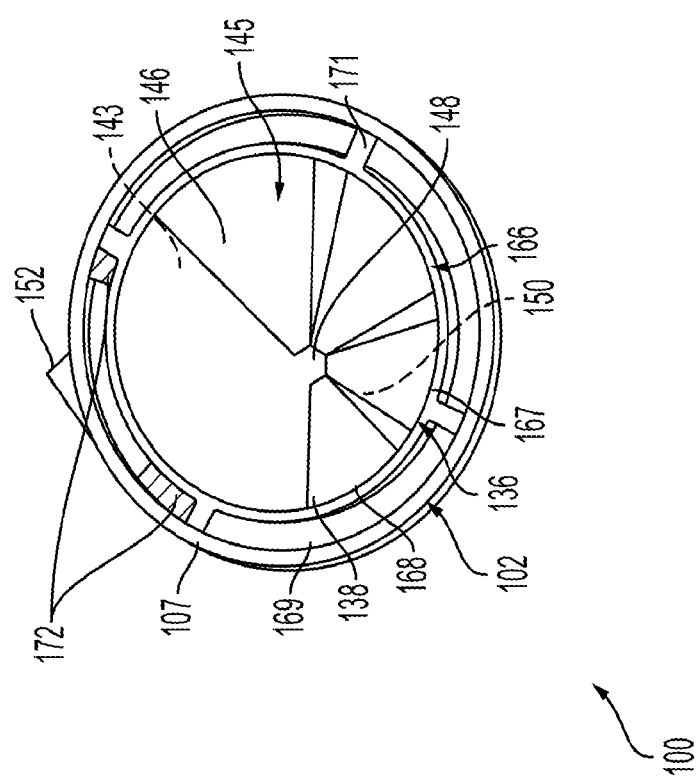
FIG. 8 is another cross-sectional view of a portion of the exhaust gas aftertreatment system of FIG. 4.

In some embodiments, as shown in FIG. 8, two inlet flange panels 172 may be utilized to cover two different portions of one of the inlet flange apertures 169. The first inlet flange panel 172 is coupled to one of the inlet flange supports 171 and the second inlet flange panel 172 is coupled to another inlet flange support 171. The first inlet flange panel 172 and the second inlet flange panel 172 thereby cooperate to constrict the inlet flange aperture 169.

Figure 9:
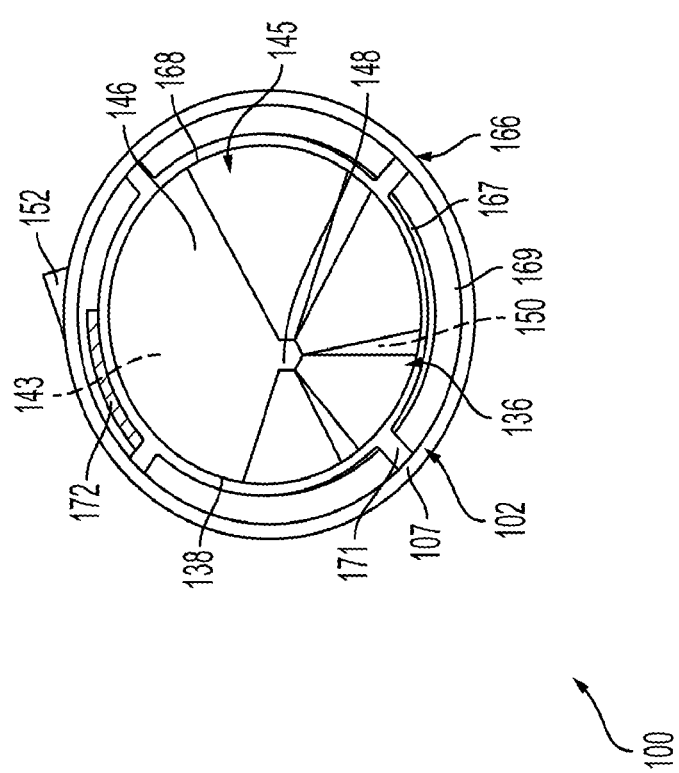
FIG. 9 is another cross-sectional view of a portion of the exhaust gas aftertreatment system of FIG. 4.

In some embodiments, as shown in FIG. 9, an inlet flange panel 172 may be coupled to the inlet flange body 167 and one of the inlet flange supports 171 so as to allow for the exhaust gas to flow between the introduction conduit 107 and the inlet flange panel 172. Here, the inlet flange panel 172 alters the flow path of the exhaust gas substantially towards the opening defined by the introduction conduit 107 and the inlet flange panel 172, and the adjacent inlet flange apertures 169.

In some embodiments, the mixer body 138 also includes an exhaust gas inlet. The exhaust gas inlet is aligned with the treatment fluid inlet 152 and is configured to facilitate flow of the exhaust gas into the mixer body 138. First, the exhaust gas flows into the passageway 170, then the exhaust gas flows though the exhaust gas inlet into the mixer body 138. For example, the exhaust gas flowing through the mixer body 138 may create a vacuum at the exhaust gas inlet and this vacuum may draw the exhaust gas flowing in the passageway 170 into the mixer body 138 via the exhaust gas inlet. The flow of the exhaust gas through the exhaust gas inlet opposes the flow of the exhaust gas and the treatment fluid through the treatment fluid inlet 152. In this way, the exhaust gas inlet may mitigate deposit formation on the mixer body 138.

In some embodiments, at least a portion of the exhaust gas flowing in the passageway 170 enters the mixer body 138 via the treatment fluid inlet 152. For example, the exhaust gas flowing through the mixer body 138 may create a vacuum at the treatment fluid inlet 152 and this vacuum may draw the exhaust gas flowing between the mixer body 138 and the introduction conduit 107 into the mixer body 138 via the treatment fluid inlet 152. The exhaust gas entering the mixer body via the treatment fluid inlet 152 may assist in propelling the treatment fluid provided by the injector 118 into the mixer cavity 144 (e.g., between the upstream vane plate 145 and the downstream vane plate 154, etc.).

In some embodiments, the exhaust gas aftertreatment system 100 also includes a midstream support flange (e.g., panel, coupler, ring, etc.). The midstream support flange is coupled to the mixer body 138 downstream of the treatment fluid inlet 152. The midstream support flange is also coupled to the introduction conduit 107. The midstream support flange functions to separate the mixer body 138 from the introduction conduit 107 and support the mixer 136 within the introduction conduit 107. In embodiments, the midstream support flange includes a plurality of midstream support flange apertures (e.g., windows, holes, etc.). Each of the midstream support flange apertures are configured to facilitate passage of the exhaust gas through the midstream support flange. As a result, the exhaust gas may flow between the mixer body 138 and the introduction conduit 107 downstream of the treatment fluid inlet 152.

Figure 10:
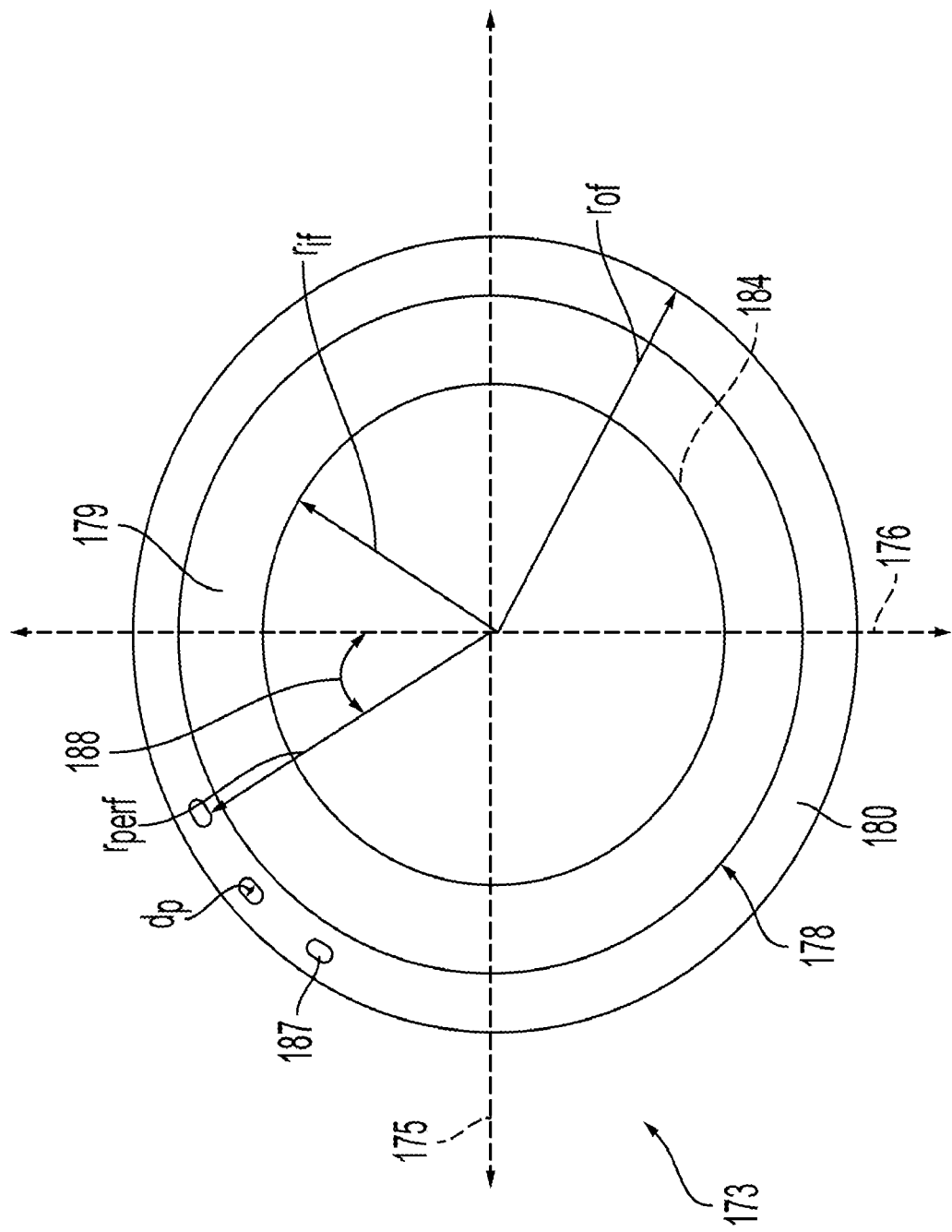
FIG. 10 is a rear view of an outlet flange of an exhaust gas aftertreatment system from downstream looking upstream.
Figure 11:
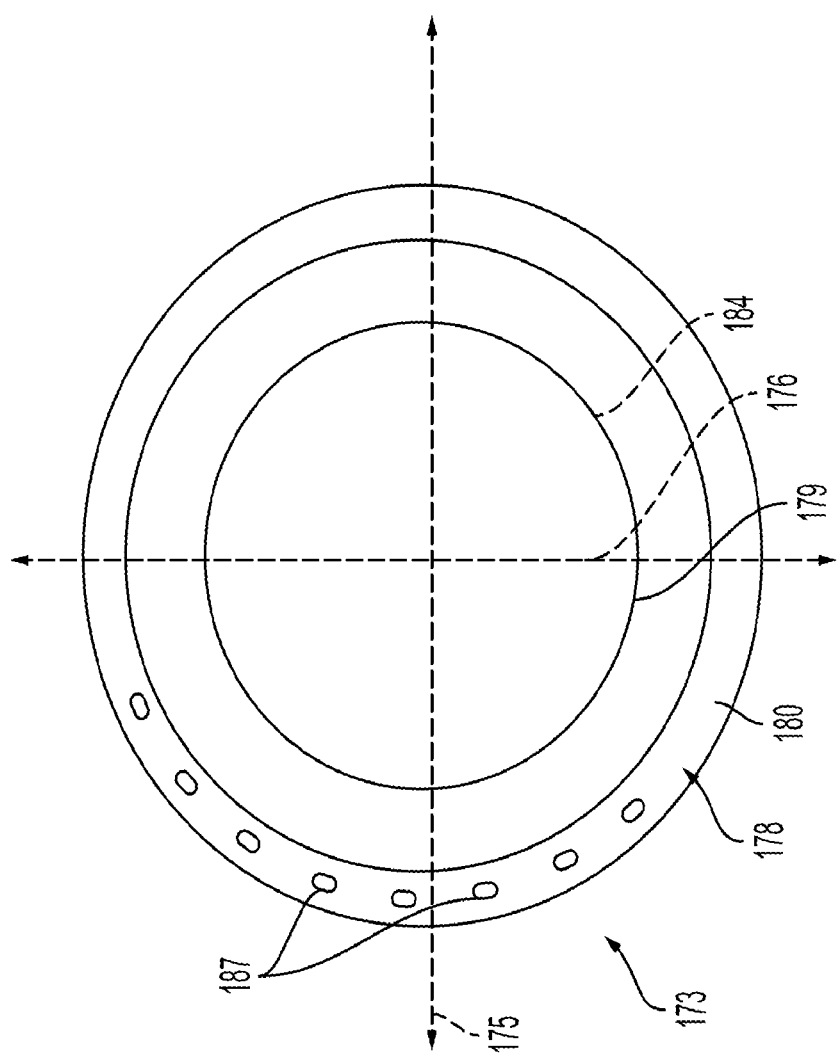
FIG. 11 is a rear view of another outlet flange of an exhaust gas aftertreatment system from downstream looking upstream.
Figure 12:
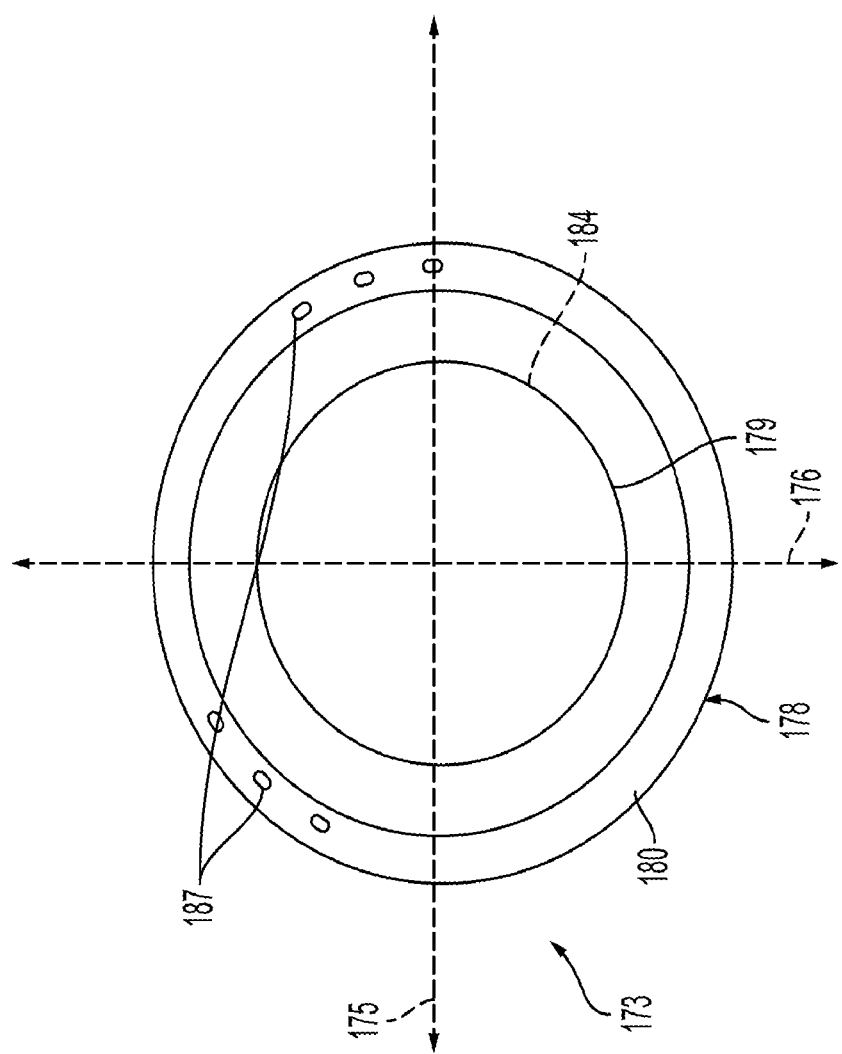
FIG. 12 is a rear view of another outlet flange of an exhaust gas aftertreatment system from downstream looking upstream.

The exhaust gas aftertreatment system 100 also includes an outlet flange 173 (e.g., panel, coupler, ring, etc.). FIGS. 10-12 depict the outlet flange 173, according to various embodiments. The outlet flange 173 is coupled to the shroud 162. The outlet flange 173 is also coupled to the introduction conduit 107. The outlet flange 173 functions to separate the shroud 162 from the introduction conduit 107 and support the mixer 136 within the introduction conduit 107.

In various embodiments, the outlet flange 173 is configured to prevent (e.g., less than 1% of the exhaust gas and the treatment fluid flowing in the passageway 170 flows between the outlet flange 173 and the mixer body 138 and between the outlet flange 173 and the introduction conduit 107, etc.) flow of the exhaust gas and the treatment fluid between the shroud 162 and the introduction conduit 107. In this way, the outlet flange 173 functions to prevent flow of the exhaust gas and the treatment fluid exiting the mixer outlet 164 from flowing back upstream towards the mixer inlet 143.

The outlet flange 173 is centered on an outlet flange center axis 174. The outlet flange center axis 174 is parallel to the mixer body center axis 139 and extends through the center of the outlet flange 173.

The outlet flange 173 has an outlet flange lateral axis 175. The outlet flange lateral axis 175 extends through the outlet flange center axis 174 and is orthogonal to the outlet flange center axis 174. The outlet flange 173 also has an outlet flange transverse axis 176. The outlet flange transverse axis 176 extends through the outlet flange center axis 174 and is orthogonal to the outlet flange center axis 174. Additionally, the outlet flange transverse axis 176 extends through the outlet flange lateral axis 175 and is orthogonal to the outlet flange lateral axis 175.

The outlet flange lateral axis 175 and the outlet flange transverse axis 176 extend along an outlet flange plane 177. In various embodiments, the outlet flange plane 177 is approximately parallel to the mixer body plane 142. In some embodiments, the dosing module mount 111 is configured such that the injection axis 119 is approximately orthogonal to the mixer body lateral axis 140, approximately parallel to the mixer body transverse axis 141, and separated from the mixer body transverse axis 141.

The outlet flange 173 includes an outlet flange body 178 centered on the outlet flange center axis 174. In various embodiments, the outlet flange body 178 is also centered on the outlet flange lateral axis 175 and the outlet flange transverse axis 176. The outlet flange body 178 includes an outlet flange body inner portion 179. The outlet flange body inner portion 179 is coupled to the outlet flange body 178 and the mixer body 138. In some embodiments, the outlet flange body inner portion 179 is coupled to the shroud 162.

The outlet flange body inner portion 179 is defined by an outlet flange body inner portion radius $r_{if}$. The outlet flange body inner portion radius $r_{if}$ may be selected based on the conduit radius $r_c$. For example, the outlet flange body inner portion 179 may be configured such that $$0.09r_c \le r_{if} \le 0.855r_c \qquad (2)$$

the outlet flange body inner portion radius $r_{if}$ is each approximately in a range of $0.09r_c$ to $0.855r_c$, inclusive (e.g., $0.085r_c$, $0.09r_c$, $0.095r_c$, $0.1r_c$, $0.15r_c$, $0.2r_c$, $0.25r_c$, $0.3r_c$, $0.35r_c$, $0.4r_c$, $0.45r_c$, $0.5r_c$, $0.55r_c$, $0.6r_c$, $0.65r_c$, $0.7r_c$, $0.75r_c$, $0.8r_c$, $0.85r_c$, $0.855r_c$, $0.897r_c$, etc.). In various embodiments, the outlet flange body inner portion radius $r_{if}$ may be approximately in a range of 0.25 inches to 11 inches, inclusive (e.g., 0.2375 inches, 0.25 inches, 1 inch, 6 inches, 8 inches, 8.4 inches, 11 inches, 11.55 inches, etc.). For example, the outlet flange body inner portion radius $r_{if}$ may be approximately equal to 7 inches. In some applications, the outlet flange body inner portion radius $r_{if}$ may be approximately equal to 0.1 inches.

The outlet flange body 178 also includes an outlet flange body outer portion 180. The outlet flange body outer portion 180 couples the outlet flange body 178 to the exhaust gas conduit system 102. The outlet flange plane 177 bisects the outlet flange body outer portion 180. In some embodiments, the outlet flange center axis 174 extends through a center point of the outlet flange body outer portion 180. In some embodiments, the outlet flange transverse axis 176 intersects a center point of the outlet flange body outer portion. The outlet flange body outer portion 180 is defined by an outlet flange body outer portion radius $r_{of}$. The outlet flange body outer portion radius $r_{of}$ may be selected based on the conduit radius $r_c$. For example, the outlet flange body outer portion 180 may be configured such that the outlet flange body outer portion radius $r_{of}$ is each approximately in a range of $0.14r_c$ to $1.00r_c$, inclusive (e.g., $0.133r_c$, $0.14r_c$, $0.19r_c$, $0.24r_c$, $0.29r_c$, $0.34r_c$, $0.39r_c$, $0.44r_c$, $0.49r_c$, $0.54r_c$, $0.59r_c$, $0.64r_c$, $0.69r_c$, $0.74r_c$, $0.79r_c$, $0.84r_c$, $0.89r_c$, $0.94r_c$, $0.99r_c$, $1.00r_c$, $1.05r_c$, etc.). In various embodiments, the outlet flange body outer portion radius $r_{of}$ may be approximately in a range of 0.25 inches to 16 inches, inclusive (e.g., 0.2375 inches, 0.25 inches, 1 inch, 6 inches, 8 inches, 10 inches, 12 inches, 16 inches, 16.8 inches, etc.). For example, the outlet flange body outer portion radius $r_{of}$ may be approximately equal to 12 inches. In some applications, the outlet flange body outer portion radius $r_{of}$ may be approximately equal to 2 inches.

The outlet flange body outer portion 180 is separated from the outlet flange inner body portion by an outlet flange angle 182. The outlet flange angle 182 is obtuse (e.g., 91°, 95°, 100°, 105°, 110°, 115°, 120°, 125°, 130°, 135°, 140°, 145°, 150°, 155°, 160°, 165°, 171°, 175°, 189°, etc.). In various embodiments, the outlet flange angle 182 is approximately in a range of 120° to 171°, inclusive (e.g., 114°, 120°, 170°, 178.5°, etc.). In some embodiments, the outlet flange angle 182 is approximately in a range of 140° to 160°, inclusive (e.g., 133°, 140°, 160°, 168°, etc.).

The outlet flange 173 includes an outlet flange opening 184. The outlet flange opening 184 extends through the outlet flange body inner portion 179. The exhaust gas conduit system 102 also includes a transfer conduit 185. The outlet flange 173 separates the introduction conduit 107 from the transfer conduit 185. The transfer conduit 185 is fluidly coupled to the introduction conduit 107 and is configured to receive the exhaust gas from the mixer outlet 164 and the passageway 170, as described herein. In various embodiments, the transfer conduit 185 is coupled to the introduction conduit 107. For example, the transfer conduit 185 may be fastened, welded, riveted, or otherwise attached to the introduction conduit 107. In other embodiments, the transfer conduit 185 is integrally formed with the introduction conduit 107. In some embodiments, the introduction conduit 107 is the transfer conduit 185 (e.g., only the introduction conduit 107 is included in the exhaust gas conduit system 102 and the introduction conduit 107 functions as both the introduction conduit 107 and the transfer conduit 185). The transfer conduit 185 is centered on the mixer body center axis 139 (e.g., the mixer body center axis 139 extends through a center point of the transfer conduit 185, etc.) and is bisected by a transfer conduit plane 186. The transfer conduit plane 186 is orthogonal to the mixer body center axis 139 and parallel to the outlet flange plane 177.

Figure 13:
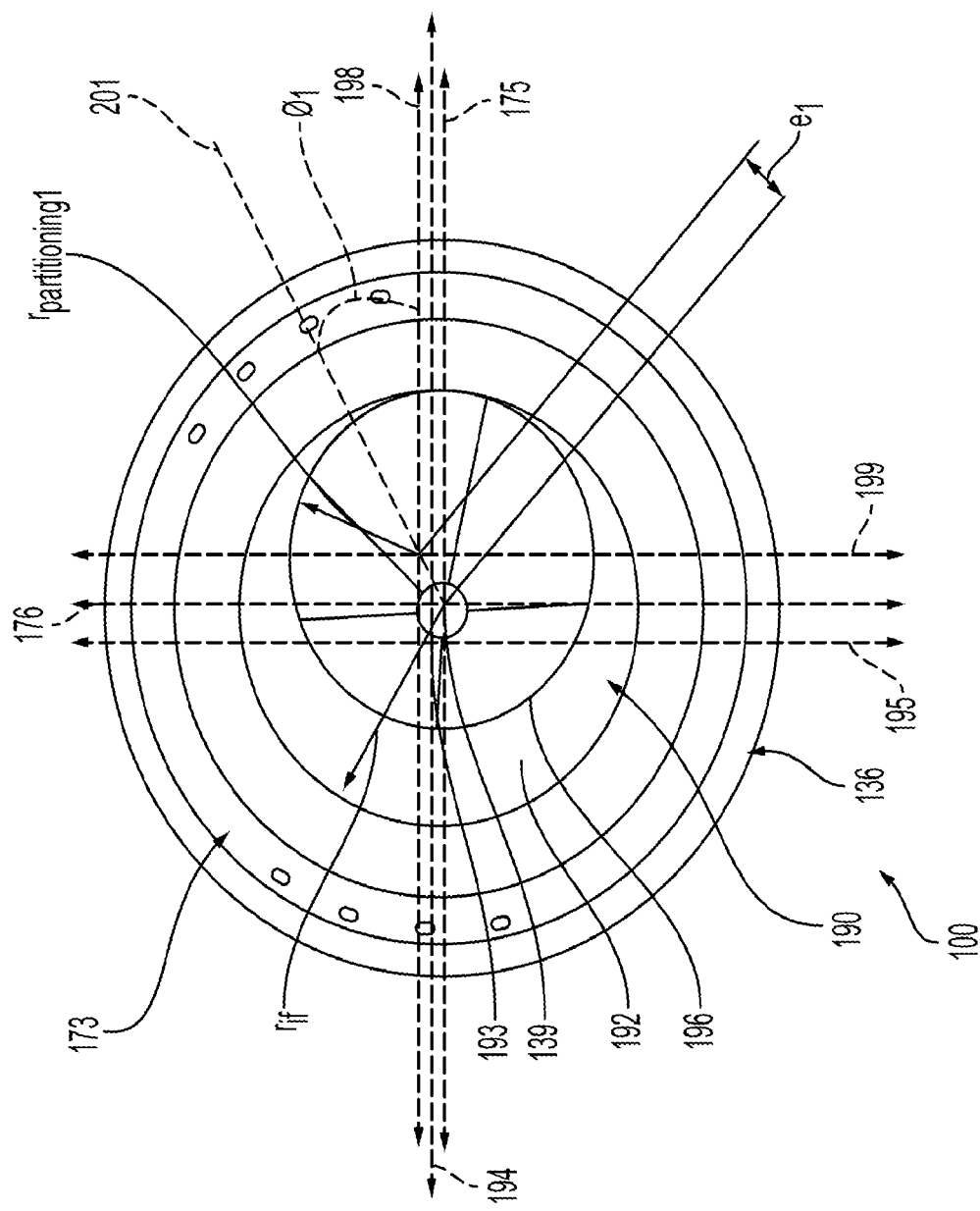
FIG. 13 is a cross-sectional view of a portion of the exhaust gas aftertreatment system of FIG. 1, from downstream looking upstream.

As shown in FIG. 13, the outlet flange opening 184 is centered on the outlet flange center axis 174. However, in some applications, the outlet flange opening 184 is not centered on the outlet flange center axis 174.

In various embodiments, the outlet flange 173 includes a plurality of outlet flange perforations 187 (e.g., windows, holes, etc.). The outlet flange 173 is shown in FIGS. 10-12, according to various embodiments. The outlet flange perforations 187 are arrayed circumferentially around a portion of the outlet flange opening 184 and extend through the outlet flange body outer portion 180. Each of the outlet flange perforations 187 is configured to facilitate passage of the exhaust gas from the passageway 170 to the transfer conduit 185. As the exhaust gas flows through the passageway 170 and the outlet flange 173 into the transfer conduit 185, the exhaust gas flows through the outlet flange perforations 187 and mixes with the exhaust gas and the treatment fluid flowing from the mixer outlet 164. Here, due to the plurality of outlet flange perforations 187, the concentration of the treatment fluid is diluted to achieve a target uniformity index. The uniformity index of the treatment fluid is an average distribution of the treatment fluid in the exhaust gas in the transfer conduit across the transfer conduit plane 186. In some embodiments, the target uniformity index is 0.97. In some embodiments, the target uniformity index is 0.98. In some embodiments, the target uniformity index is 0.99. In some embodiments, the target uniformity index is 1.00.

The location of the outlet flange perforation 187 are selected so as to obtain a target uniformity index. Specifically, each of the outlet flange perforations 187 is positioned at an outlet flange perforation radius $r_{perf}$ from a center point (e.g., an intersection of the outlet flange lateral axis 175 and the outlet flange transverse axis 176, etc.) of the outlet flange 173. Each outlet flange perforation radius $r_{perf}$ extends from the center point of the outlet flange 173 to a center point of each of the outlet flange perforations 187. The outlet flange perforation radius $r_{perf}$ is based on the outlet flange body outer portion radius $r_{of}$, the outlet flange body inner portion radius $r_{if}$, and a variable k that may be selected so that the outlet flange 173 is tailored for a target application. In some embodiments, the outlet flange 173 is configured such that $$r_{perf} = r_{if} + k(r_{of} - r_{if}) \quad (3)$$

the outlet flange perforation radius $r_{perf}$ is equal to a sum of (i) the outlet flange body inner portion radius $r_{if}$ and (ii) a product of the variable and a difference between the outlet flange body outer portion radius $r_{of}$ and the outlet flange body inner portion radius $r_{if}$.

The variable k may approximately be in a range of 0 to 0.95, inclusive (e.g. 0, 0.05, 0.1, 0.15, 0.2, 0.25, 0.3, 0.35, 0.4, 0.45, 0.5, 0.6, 0.65, 0.7, 0.75, 0.8, 0.95, 0.99, etc.). Additionally, the outlet flange perforation radius $r_{perf}$ based on the conduit radius $r_c$ is $$r_c(0.09 + 0.05k) \le r_{perf} \le r_c(0.855 + 0.475k) \quad (4)$$

in various embodiments.

Each of the outlet flange perforations 187 have an outlet flange perforation diameter $d_p$. In various embodiments, the outlet flange perforation diameter $d_p$ is approximately in a range of 0.0787 inches to 1.181 inches, inclusive (e.g., 0.07478 inches, 0.0787 inches, 0.5 inches, 1 inch, 1.181 inches, 1.24 inches, etc.). The outlet flange perforation diameter, $d_p$, is a chord that extends through the center of each of the outlet flange perforations and defines the area.

Each of the plurality of outlet flange perforations 187 are arrayed circumferentially such that a center point of each of the outlet flange perforations 187 is separated by an outlet flange perforation angle 188 relative to the outlet flange transverse axis 176. The outlet flange perforation angle 188 is approximately in a range of 5° to 355°, inclusive (e.g., 4.75°, 5°, 10°, 15°, 80°, 85°, 90°, 95°, 100°, 135°, 215°, 220°, 225°, 240°, 245°, 250°, 255°, 260°, 320°, 325°, 350°, 355°, 359°, etc.). In some embodiments, the outlet flange perforation angle 188 is approximately in a range of 5° to 90°, inclusive. In some embodiments, the outlet flange perforation angle 188 is not approximately in a range of 0° to 4.99°, not approximately in a range of 356° to 360°.

Accordingly, each of the outlet flange perforations 187 may be positioned on the outlet flange body outer portion 180 in various arrangements to achieve the target uniformity index.

In various embodiments, as shown in FIG. 11, each of the outlet flange perforations 187 may be separated from the outlet flange transverse axis 176 such that the outlet flange perforation angle 188 for each of the outlet flange perforations 187 is approximately in a range of 30° to 135° (e.g., 28.5°, 30°, 45°, 60°, 75°, 90°, 105°, 120°, 135°, 141.75°, etc.). In some embodiments, as shown in FIG. 12, each of the outlet flange perforations 187 may be separated from the outlet flange transverse axis 176 such that the outlet flange perforation angle 188 for each of the outlet flange perforations 187 is approximately in a range of 15° to 45°, inclusive (e.g., 14.25°, 15°, 30°, 45°, 47.25°, etc.) and approximately in a range of 285° to 315°, inclusive (e.g., 270.75°, 285, 300°, 315°, 330.75°, etc.).

In addition to the outlet flange perforation angle 188, each of the outlet flange perforations 187 is defined by an angular separation from one or more adjacent outlet flange perforations 187. The angular separations between pairs of adjacent outlet flange perforations 187 may be the same for all pairs of adjacent outlet flange perforations 187 or may vary amongst the pairs of adjacent outlet flange perforations 187. In various embodiments, each of the outlet flange perforations 187 is separated from an adjacent outlet flange perforation 187 by an angular separation that is approximately equal to 15°.

The injector 118 is also defined by an injector axial axis 189. The injector axial axis 189 is parallel to the mixer body center axis 139 and intersects the injector 118. The injector axial axis 189 extends within the passageway 170. In various embodiments, each of the outlet flange perforations 187 is positioned adjacent the injector axial axis 189. As a result, the outlet flange perforations 187 facilitate flow of the exhaust gas within the passageway 170 at locations along the outlet flange 173 that are axially adjacent to the injector 118. This reduces recirculation of the exhaust gas near the injector 118 and mitigates deposit formation proximate the injector 118 while providing additional exhaust gas into the transfer conduit 185 at target locations which are selected to dilute the mixture of the exhaust gas and the treatment fluid at those locations. Here, the exhaust gas is introduced from the outlet flange perforation 187 to the exhaust gas and treatment fluid and caused to further mix reducing the concentration of the treatment fluid within the exhaust gas so that the target uniformity index is achieved.

In various embodiments, the inlet flange 166 is configured such that at least one of the inlet flange apertures 169 is positioned adjacent the injector axial axis 189 so as to facilitate flow into the passageway 170 proximate the injector 118. Such an arrangement enables the exhaust gas flows from the inlet conduit 104 to the transfer conduit 185 along the injector axial axis 189 and may assist in dilution.

In various embodiments, the exhaust gas aftertreatment system 100 includes a partitioning plate 190, as shown in greater detail in FIG. 13. The partitioning plate 190 is configured to facilitate additional mixing of the exhaust gas and the treatment fluid to assist in achieving the target uniformity index.

The partitioning plate 190 includes a partitioning plate body 192. In various embodiments, the partitioning plate body 192 is coupled to the shroud 162 around the mixer outlet 164. In some embodiments, the partitioning plate body 192 is integrally formed with the shroud 162. The partitioning plate body 192 may be coupled to the outlet flange body inner portion 179 (e.g., about the outlet flange opening 184). In some embodiments, the partitioning plate body 192 is integrally formed with the outlet flange 173.

The partitioning plate 190 is centered on a partitioning plate center axis 193. The partitioning plate center axis 193 is parallel to the mixer body center axis 139 and extends through the center of the partitioning plate 190.

The partitioning plate 190 has a partitioning plate lateral axis 194. The partitioning plate lateral axis 194 extends through the partitioning plate center axis 193 and is orthogonal to the partitioning plate center axis 193. The partitioning plate 190 also has a partitioning plate transverse axis 195. The partitioning plate transverse axis 195 extends through the partitioning plate center axis 193 and is orthogonal to the partitioning plate center axis 193. Additionally, the partitioning plate transverse axis 195 extends through the partitioning plate lateral axis 194 and is orthogonal to the partitioning plate lateral axis 194.

The partitioning plate 190 includes a partitioning plate opening 196. The partitioning plate opening 196 is disposed on the partitioning plate body 192 and is configured to facilitate flow of the exhaust gas and treatment fluid through the partitioning plate 190 and to the transfer conduit 185 while facilitating additional mixing of the exhaust gas and the treatment fluid. Specifically, some of the exhaust gas and the treatment fluid flow towards the partitioning plate opening 196 and are impeded by the partitioning plate body 192. This impedance causes the exhaust gas and the treatment fluid to be redirected towards the partitioning plate opening 196 (e.g., across the partitioning plate body 192, etc.).

The partitioning plate opening 196 is centered on a partitioning plate opening center axis 197. The partitioning plate opening center axis 197 is parallel to the partitioning plate center axis 193 and extends through the center of the partitioning plate opening 196.

The partitioning plate opening 196 has a partitioning plate opening lateral axis 198. The partitioning plate opening lateral axis 198 extends through the partitioning plate opening center axis 197 and is orthogonal to the partitioning plate opening center axis 197. The partitioning plate opening 196 also has a partitioning plate opening transverse axis 199. The partitioning plate opening transverse axis 199 extends through the partitioning plate opening center axis 197 and is orthogonal to the partitioning plate opening center axis 197. Additionally, the partitioning plate opening transverse axis 199 extends through the partitioning plate opening lateral axis 198 and is orthogonal to the partitioning plate opening lateral axis 198.

In various embodiments, the partitioning plate opening lateral axis 198 is parallel to and laterally offset from the outlet flange lateral axis 175 and the partitioning plate opening transverse axis 199 is parallel to and offset to the outlet flange transverse axis 176.

The partitioning plate opening 196 has a partitioning plate opening radius $r_{partitioning}$ defined from the center of the partitioning plate opening 196 (e.g., the partitioning plate opening center axis 197). In various embodiments, the partitioning plate opening radius $r_{partitioning}$ is approximately in a range of 0.787 inches to 3.937 inches, inclusive (e.g., 0.748 inches, 0.787 inches, 1 inch, 1.5 inches, 2 inches, 3.937 inches, 4.134 inches, etc.).

The partitioning plate opening center axis 197 is offset relative to the outlet flange center axis 174. Specifically, at least one of: the partitioning plate opening lateral axis 198 is offset from the outlet flange lateral axis 175, or the partitioning plate opening transverse axis 199 is offset from the outlet flange transverse axis 176. As a result, the partitioning plate opening 196 is positioned eccentrically to the outlet flange 173, and therefore to the outlet flange opening 184. Specifically, the partitioning plate opening 196 is defined by a radial eccentric distance $e_1$ and an angular eccentric distance $\emptyset_1$. The radial eccentric distance $e_1$ is defined by a distance between the partitioning plate opening center axis 197 and the outlet flange center axis 174 (e.g., as measured along the outlet flange plane 177 or a plane parallel to the outlet flange plane 177, etc.). In various embodiments, the radial eccentric distance $e_1$ is $$0.05(r_{if} - r_{partitioning}) \leq e_1 \leq 0.95(r_{if} - r_{partitioning}) \quad (5)$$

as a function of the outlet flange body inner portion radius $r_{if}$ and the partitioning plate opening radius $r_{partitioning}$.

The angular eccentric distance $\emptyset_1$ is defined by an angle between the partitioning plate opening lateral axis 198 and a reference axis 201 that extends between the partitioning plate opening center axis 197 and the outlet flange center axis 174 and along the outlet flange plane 177 or a plane parallel to the outlet flange plane 177. The angular eccentric distance $\emptyset_1$ may approximately be in a range of 0° to 359.5°, inclusive (e.g., 0°, 10°, 15°, 20°, 25°, 80°, 85°, 90°, 95°, 160°, 165°, 171°, 325°, 330°, 335°, 355°, 359.5°).

In some embodiments, the partitioning plate 190 may include a screen (e.g., mesh, grate, etc.). The screen is coupled to the partitioning plate body 192 and extends across the partitioning plate opening 196. The screen includes a plurality of apertures configured to alter and facilitate flow of the exhaust gas to the transfer conduit 185.

In various embodiments, the exhaust gas aftertreatment system 100 includes a perforated dividing plate 202, as shown in greater detail in FIGS. 14-17. In various embodiments, the exhaust gas aftertreatment system 100 may include the perforated dividing plate 202 and the partitioning plate 190. However, the exhaust gas aftertreatment system 100 may only include either the perforated dividing plate 202 or the partitioning plate 190. The perforated dividing plate 202 is positioned downstream of the outlet flange 173 and is coupled to the transfer conduit 185.

The perforated dividing plate 202 includes a perforated dividing plate body 203. The perforated dividing plate body 203 is centered on a perforated dividing plate body center axis 204. The perforated dividing plate body center axis 204 may be parallel to the partitioning plate center axis 193.

The perforated dividing plate body 203 has a perforated dividing plate body lateral axis 205. The perforated dividing plate body lateral axis 205 extends through the perforated dividing plate body center axis 204 and is orthogonal to the perforated dividing plate body center axis 204. The perforated dividing plate body 203 also has a perforated dividing plate body transverse axis 206. The perforated dividing plate body transverse axis 206 extends through the perforated dividing plate body center axis 204 and is orthogonal to the perforated dividing plate body center axis 204. Additionally, the perforated dividing plate body transverse axis 206 extends through the perforated dividing plate body lateral axis 205 and is orthogonal to the perforated dividing plate body lateral axis 205.

The perforated dividing plate body 203 is defined by a perforated dividing plate radius $r_{dividing}$. In various embodiments, the perforated dividing plate radius $r_{dividing}$ is approximately in a range of $0.14r_c$ to $1.00r_c$, inclusive (e.g., $0.133r_c$, $0.14r_c$, $0.19r_c$, $0.24r_c$, $0.29r_c$, $0.34r_c$, $0.39r_c$, $0.44r_c$, $0.49r_c$, $0.54r_c$, $0.59r_c$, $0.64r_c$, $0.69r_c$, $0.74r_c$, $0.79r_c$, $0.84r_c$, $0.89r_c$, $0.94r_c$, $0.99r_c$, $1.00r_c$, $1.05r_c$, etc.). In various embodiments, the perforated dividing plate radius $r_{dividing}$ may be approximately in a range of 0.25 inches to 16 inches, inclusive (e.g., 0.2375 inches, 0.25 inches, 1 inch, 6 inches, 8 inches, 10 inches, 12 inches, 16 inches, 16.8 inches, etc.). For example, the perforated dividing plate radius $r_{dividing}$ may be approximately equal to 12 inches. In some applications, the perforated dividing plate radius $r_{dividing}$ may be approximately equal to 2 inches.

The perforated dividing plate 202 includes a perforated region 207. The perforated dividing plate 202 includes a plurality of perforated dividing plate perforations 208 that are disposed on the perforated dividing plate body 203 within the perforated region 207. In various embodiments, the perforated dividing plate body 203 does not include any perforations outside of the perforated region 207.

In some embodiments, the perforated region 207 is configured such that at least three of the perforated dividing plate perforations 208 are truncated (e.g., intersected, etc.) by a boundary (e.g., edge, border, etc.) of the perforated region 207. In other embodiments, the perforated region 207 is configured such that none of the perforated dividing plate perforations 208 are truncated by the boundary of the perforated region 207.

Figure 14:
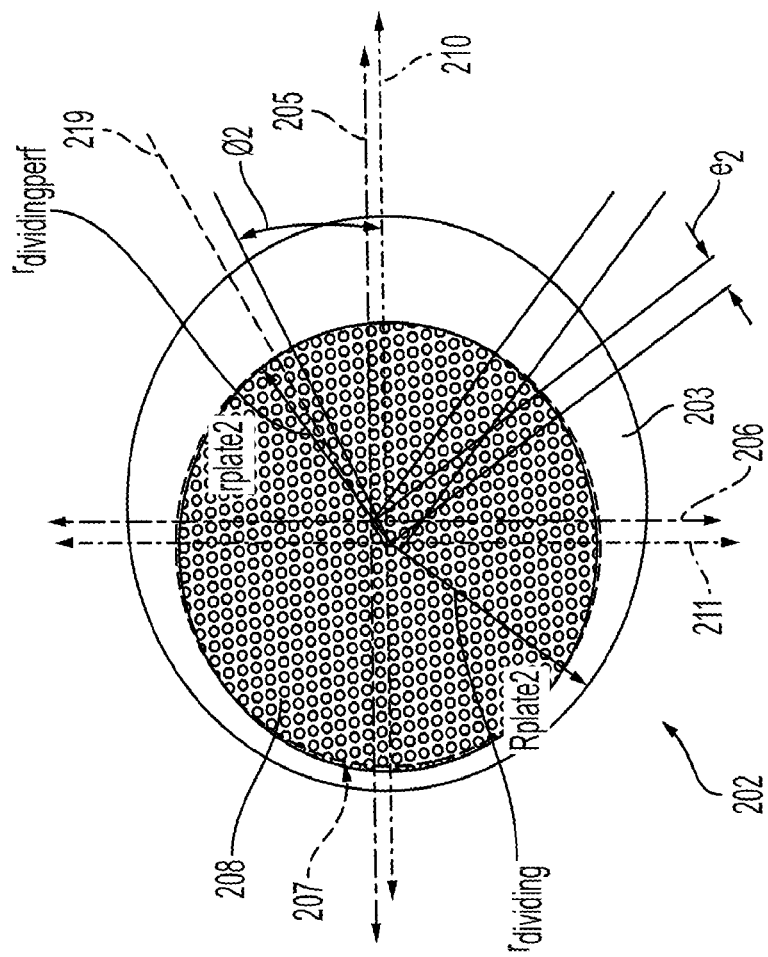
FIG. 14 is a front view of a perforated dividing plate of an exhaust gas aftertreatment system from upstream looking downstream.

The perforated dividing plate perforations 208 may be arranged uniformly (e.g., with uniform size, with uniform spacing, with uniform size and spacing, etc.) within the perforated region 207, etc. The perforated dividing plate perforations 208 may be circumferentially arrayed in a grid pattern within the perforated region 207. For example, the perforated dividing plate perforations 208 may be arranged in a plurality of staggered rows and columns, as shown in FIG. 14.

The perforated region 207 is positioned on the perforated dividing plate body 203 and centered on a perforated dividing plate region center axis 209. The perforated region 207 is defined by a shape (e.g., circle, ellipse, oval, rectangle, etc.). In various embodiments, the perforated region 207 is circular. The perforated dividing plate region center axis 209 may be parallel to the perforated dividing plate body center axis 204.

The perforated region 207 has a perforated dividing plate region lateral axis 210. The perforated dividing plate region lateral axis 210 extends through the perforated dividing plate region center axis 209 and is orthogonal to the perforated dividing plate region center axis 209. The perforated region 207 also has a perforated dividing plate region transverse axis 211. The perforated dividing plate region transverse axis 211 extends through the perforated dividing plate region center axis 209 and is orthogonal to the perforated dividing plate region center axis 209. Additionally, the perforated dividing plate region transverse axis 211 extends through the perforated dividing plate region lateral axis 210 and is orthogonal to the perforated dividing plate region lateral axis 210.

The perforated region 207 is defined by a perforated area radius $r_{dividingperf}$. In various embodiments, the perforated area radius $r_{dividingperf}$ is approximately in a range of $0.10r_c$ to $0.95r_c$, inclusive (e.g., $0.095r_c$, $0.10r_c$, $0.19r_c$, $0.24r_c$, $0.29r_c$, $0.34r_c$, $0.39r_c$, $0.44r_c$, $0.49r_c$, $0.54r_c$, $0.59r_c$, $0.64r_c$, $0.69r_c$, $0.74r_c$, $0.79r_c$, $0.84r_c$, $0.89r_c$, $0.95r_c$, $0.9975r_c$, etc.).

The perforated dividing plate region lateral axis 210 and the perforated dividing plate region transverse axis 211 extend along a perforated dividing plate plane 212. In various embodiments, the perforated dividing plate plane 212 is approximately parallel to the mixer body plane 142.

The perforated dividing plate body center axis 204 is offset from the perforated dividing plate region center axis 209. As a result, the perforated dividing plate perforations 208 are positioned eccentrically on the perforated dividing plate 202. Specifically, the perforated dividing plate perforations 208 are radially eccentric $e_2$ and angularly eccentric $Ø_2$. The radial eccentric distance $e_2$ is defined by a shortest distance between the perforated dividing plate region center axis 209 and the perforated dividing plate body center axis 204. The radial eccentric distance $e_2$ is defined by a distance between the perforated dividing plate region center axis 209 and the perforated dividing plate body center axis 204 (e.g., as measured along the perforated dividing plate plane 212 or a plane parallel to the perforated dividing plate plane 212, etc.). In various embodiments, the radial eccentric distance $e_2$ is $$005(r_{dividing} - r_{dividingperf}) \le e_2 \le 0.95(r_{dividing} - r_{dividingperf}) \quad (6)$$

as a function of the perforated dividing plate radius $r_{dividing}$ and the perforated area radius $r_{dividingperf}$.

The angular eccentricity $Ø_2$ is defined by an angle from the perforated dividing plate region lateral axis 210 to a reference axis 219. The reference axis 219 extends between the perforated dividing plate body center axis 204 and the perforated dividing plate region center axis 209 and along the perforated dividing plate plane 212 or a plane parallel to the perforated dividing plate plane 212. In various embodiments, the angular eccentricity $Ø_2$ is approximately in a range of 0° to 359.5°, inclusive (e.g., 0°, 10°, 65°, 160°, 165°, 171°, 350°, 355°, 359.5°, etc.).

The perforated dividing plate perforations 208 extend through the perforated dividing plate body 203. Each of the perforated dividing plate perforations 208 is configured to facilitate passage of the exhaust gas and treatment fluid through the perforated dividing plate 202. As the exhaust gas and the treatment fluid flow downstream from the mixer outlet 164 towards the perforated dividing plate 202, flow of the exhaust gas and the treatment fluid is impeded by the perforated dividing plate body 203. As a result of the impedance, the exhaust gas and the treatment fluid are redirected towards the plurality of perforated dividing plate perforations 208. The exhaust gas and the treatment fluid then flow through the perforated dividing plate perforations 208 which generates mixing of the exhaust gas and the treatment fluid, which assists in achieving the target uniformity index.

In various embodiments, the perforated region 207 is a perforated area opening. Specifically, the perforated area opening extends through the perforated dividing plate body 203. Here, the perforated dividing plate 202 may include a screen that is coupled to the perforated dividing plate body 203 and extends across perforated area opening. The screen includes a plurality of apertures configured to operate similarly to the perforated dividing plate perforations 208.

Figure 15:
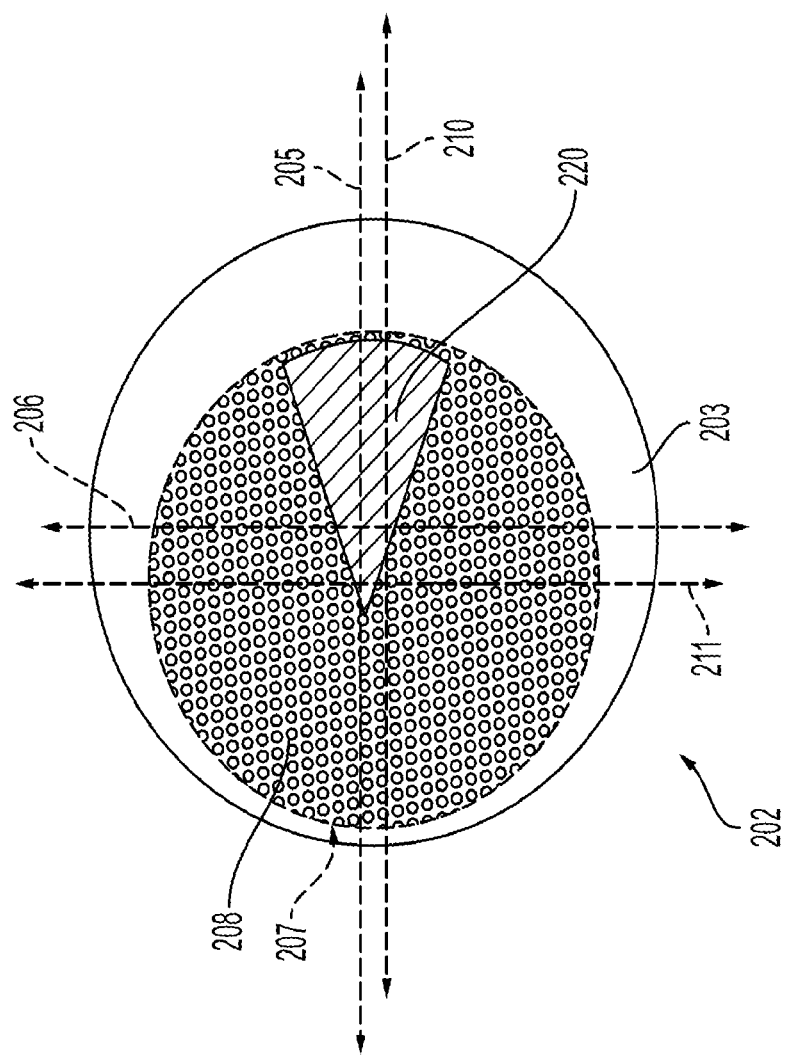
FIG. 15 is a front view of another perforated dividing plate of an exhaust gas aftertreatment system from upstream looking downstream.
Figure 16:
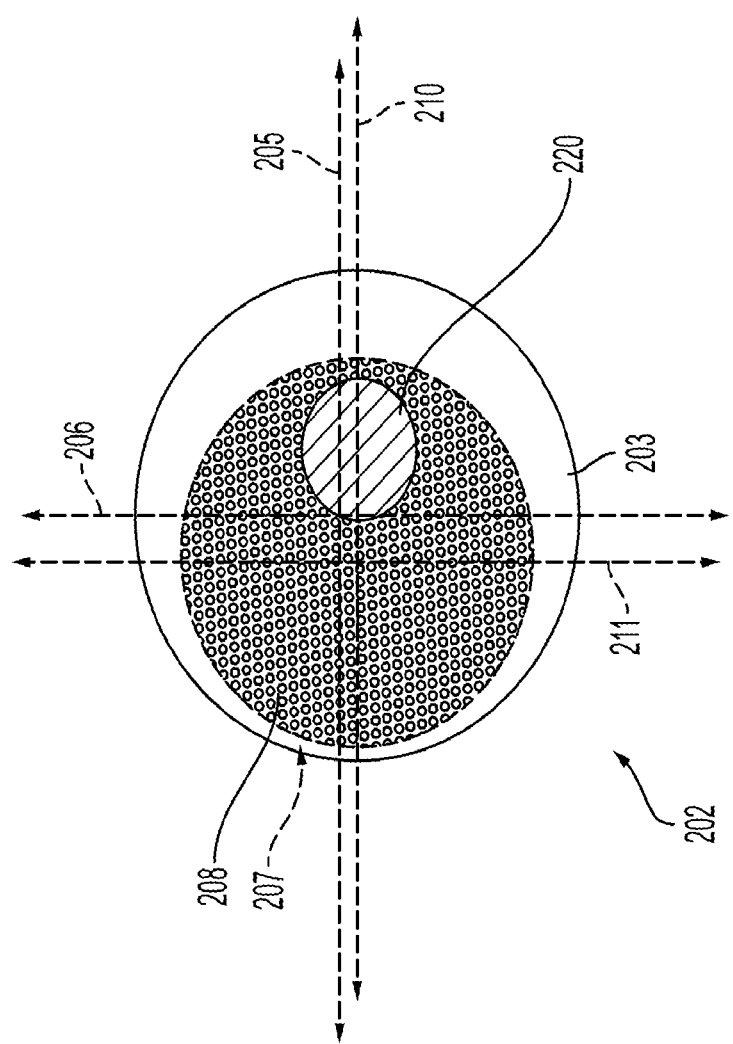
FIG. 16 a front view of another perforated dividing plate of an exhaust gas aftertreatment system from upstream looking downstream.
Figure 17:
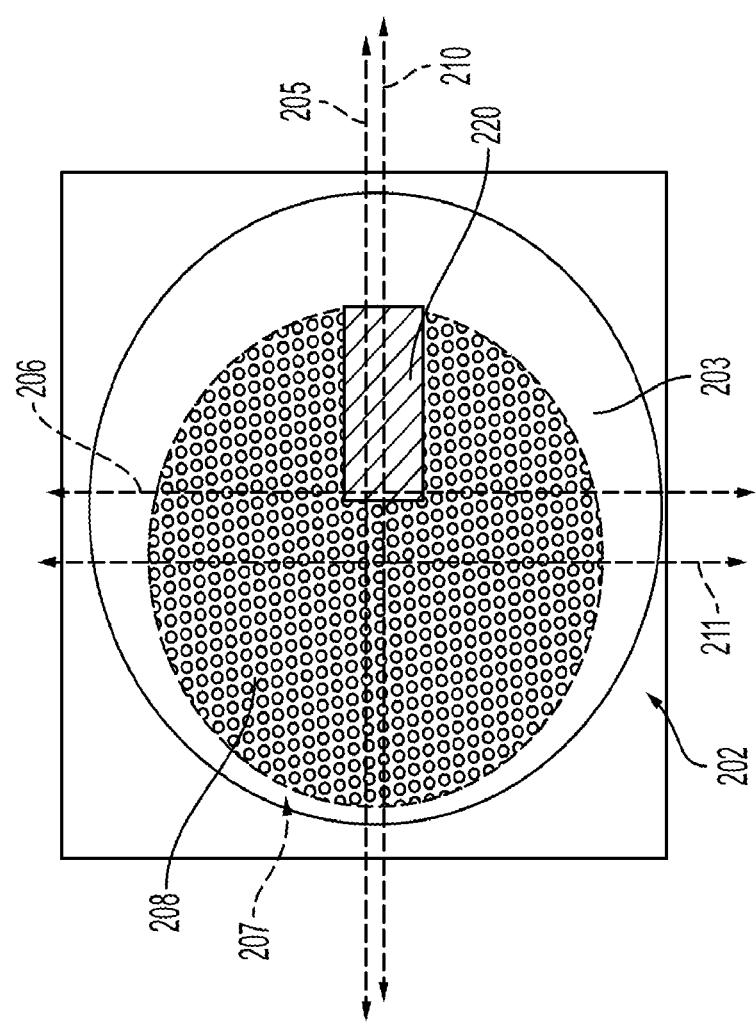
FIG. 17 a front view of another perforated dividing plate of an exhaust gas aftertreatment system from upstream looking downstream.

In various embodiments, as shown in FIGS. 15-17, the perforated dividing plate 202 includes a perforated dividing plate panel 220. The perforated dividing plate panel 220 is configured to seal a portion of the perforated dividing plate perforations 208 such that the flow of the exhaust gas and the treatment fluid is altered from flowing through the sealed portion of the perforated dividing plate perforations 208. As a result, the exhaust gas and the treatment fluid are redirected towards the unimpeded portions of the perforated dividing plate perforations 208 causing further mixing.

The perforated dividing plate panel 220 may be configured to be a shape (e.g., triangle, rectangle, circle, oval, square, etc.). In some embodiments, as shown in FIG. 15, the perforated dividing plate panel 220 is configured to be a sector of a circle. In some embodiments, as shown in FIG. 16, the perforated dividing plate panel 220 is a circle. Here, the flow of the exhaust gas and the treatment fluid altered is substantially similar along the perforated dividing plate region transverse axis 211 and the perforated dividing plate region lateral axis 210. This causes the exhaust gas and the treatment fluid to tumble evenly across perforated dividing plate panel 220 towards adjacent unimpeded perforated dividing plate perforation 208. In some embodiments, as shown in FIG. 17, the perforated dividing plate panel 220 is a rectangle. Here, the flow of the exhaust gas and the treatment fluid altered is substantially greater along the perforated dividing plate region lateral axis 210 than the perforated dividing plate region transverse axis 211. This causes the exhaust gas and the treatment fluid to be redirected across the perforated dividing plate panel 220 (e.g., along the perforated dividing plate region lateral axis 210, etc.).

In various embodiments, the exhaust gas aftertreatment system 100 may also include a perforated straightening plate 222 (e.g., straightening plate, flow straightener, etc.). The perforated straightening plate 222 is coupled to the transfer conduit 185 downstream of the outlet flange 173. The perforated straightening plate 222 extends across the transfer conduit 185. In various embodiments, the perforated straightening plate 222 extends along a plane that is approximately parallel to the transfer conduit plane 186.

The perforated straightening plate 222 includes a plurality of perforations 224 (e.g., holes, apertures, windows, etc.). Each of the perforations 224 facilitates passage of the exhaust gas and the treatment fluid through the perforated straightening plate 222. The perforated straightening plate 222 is configured such that flow of the exhaust gas and the treatment fluid between the perforated straightening plate 222 and the transfer conduit 185 is substantially prevented (e.g., less than 1% of the exhaust gas and the treatment fluid flows between the perforated straightening plate 222 and the transfer conduit 185, etc.).

The perforations 224 function to straighten flow of the exhaust gas and the treatment fluid downstream of the perforated straightening plate 222. For example, the exhaust gas and the treatment fluid, which may be tumbling upstream of the perforated straightening plate 222, may flow through the perforated straightening plate 222 via the perforations 224, and then may flow along relatively straight flow paths downstream of the perforated straightening plate 222.

The perforated straightening plate 222 may be variously configured so as to be tailored for a target application. For example, a number of the perforations 224, locations of each of the perforations 224, and/or sizes (e.g., diameters, etc.) of each of the perforations 224 may be individually selected such that the perforated straightening plate 222 is tailored for a target application. By variously locating the perforations 224, the exhaust gas and the treatment fluid can be directed to target locations downstream of the perforated straightening plate 222 because of the straight flow paths.

The exhaust gas aftertreatment system 100 also includes a catalyst member 226 (e.g., conversion catalyst member, selective catalytic reduction (SCR) catalyst member, catalyst metals, etc.). The catalyst member 226 is coupled to the transfer conduit 185. For example, the catalyst member 226 may be disposed within a shell (e.g., housing, sleeve, etc.) which is press-fit within the transfer conduit 185.

In various embodiments, the catalyst member 226 is configured to cause decomposition of components of the exhaust gas using reductant (e.g., via catalytic reactions, etc.). In these embodiments, the treatment fluid provided by the dosing module 110 is reductant. Specifically, the reductant that has been provided into the exhaust gas by the injector 118 undergoes the processes of evaporation, thermolysis, and hydrolysis to form non-$NO_x$ emissions within the transfer conduit 185 and/or the catalyst member 226. In this way, the catalyst member 226 is configured to assist in the reduction of $NO_x$ emissions by accelerating a $NO_x$ reduction process between the reductant and the $NO_x$ of the exhaust gas into diatomic nitrogen, water, and/or carbon dioxide. The catalyst member 226 may include, for example, platinum, rhodium, palladium, or other similar materials. In some embodiments, the catalyst member 226 is a ceramic conversion catalyst member.

In various embodiments, the catalyst member 226 may include multiple portions. For example, the catalyst member 226 may include a first portion that includes platinum and a second portion that includes rhodium. By including multiple portions, an ability of the catalyst member 226 to facilitate treatment of the exhaust gas may be tailored for a target application.

The exhaust gas conduit system 102 also includes an outlet conduit 228. The outlet conduit 228 is fluidly coupled to the transfer conduit 185 and is configured to receive the exhaust gas from the transfer conduit 185. In various embodiments, the outlet conduit 228 is coupled to the transfer conduit 185. For example, the outlet conduit 228 may be fastened, welded, riveted, or otherwise attached to the transfer conduit 185. In other embodiments, the outlet conduit 228 is integrally formed with the transfer conduit 185. In some embodiments, the transfer conduit 185 is the outlet conduit 228 (e.g., only the transfer conduit 185 is included in the exhaust gas conduit system 102 and the transfer conduit 185 functions as both the transfer conduit 185 and the outlet conduit 228). The outlet conduit 228 is centered on the mixer body center axis 139 (e.g., the mixer body center axis 139 extends through a center point of the outlet conduit 228, etc.).

In various embodiments, the exhaust gas conduit system 102 only includes a single conduit that functions as the inlet conduit 104, the introduction conduit 107, the transfer conduit 185, and the outlet conduit 228.

In various embodiments, the exhaust gas aftertreatment system 100 also includes a sensor 230 (e.g., sensing unit, detector, flow rate sensor, mass flow rate sensor, volumetric flow rate sensor, velocity sensor, pressure sensor, temperature sensor, thermocouple, $NO_x$ sensor, CO sensor, $CO_2$ sensor, $O_2$ sensor, particulate sensor, nitrogen sensor, etc.). The sensor 230 is coupled to the transfer conduit 185 and is configured to measure (e.g., sense, detect, etc.) a parameter (e.g., flow rate, mass flow rate, volumetric flow rate, velocity, pressure, temperature, $NO_x$ concentration, CO concentration, $CO_2$ concentration, $O_2$ concentration, particulate concentration, nitrogen concentration, etc.) of the exhaust gas and the treatment fluid within the transfer conduit 185. In various embodiments, the sensor 230 is located downstream of the outlet flange 173.

The sensor 230 is electrically or communicatively coupled to the controller 126 and is configured to provide a signal associated with the parameter to the controller 126. The controller 126 (e.g., via the processing circuit 128, etc.) is configured to determine the parameter based on the signal. The controller 126 may be configured to control the dosing module 110, the treatment fluid pump 114, and/or the air pump 120 based on the signal. Furthermore, the controller 126 may be configured to communicate the signal to the central controller 134.

While the exhaust gas aftertreatment system 100 has been shown and described in the context of use with a diesel internal combustion engine, the exhaust gas aftertreatment system 100 may be used with other internal combustion engines, such as gasoline internal combustion engines, hybrid internal combustion engines, propane internal combustion engines, dual-fuel internal combustion engines, and other similar internal combustion engines.

III. Configuration of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, treatment fluid, an air-treatment fluid mixture, exhaust gas, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust gas aftertreatment system comprising:
an introduction conduit centered on a conduit center axis;
a dosing module coupled to the introduction conduit and comprising an injector that is configured to provide a treatment fluid into the introduction conduit and that is defined by an injection axis;
a mixer disposed within the introduction conduit and comprising a mixer body configured to receive exhaust gas and the treatment fluid; and
an outlet flange comprising:
an outlet flange body centered on an outlet flange center axis, the outlet flange body comprising:
an outlet flange body inner portion coupled to the mixer body and extending radially outward from the mixer body,
an outlet flange body outer portion coupled to the introduction conduit, separating the outlet flange body inner portion from the introduction conduit, and extending at an outlet flange angle away from the outlet flange body inner portion and downstream of the mixer, the outlet flange angle being obtuse,
an outlet flange opening extending through the outlet flange body inner portion, and
a plurality of outlet flange perforations extending through the outlet flange body outer portion and arrayed circumferentially around a portion of the outlet flange opening.

2. The exhaust gas aftertreatment system of claim 1, wherein:
the introduction conduit has a radius ($r_c$);
the mixer body has a radius ($r_{mb}$); and $$0.30 r_c \leq r_{mb} \leq 0.90 r_c.$$

3. The exhaust gas aftertreatment system of claim 2, wherein:
the outlet flange body inner portion has a radius ($r_{if}$), and $$0.09 r_c \leq r_{if} \leq 0.855 r_c.$$

4. The exhaust gas aftertreatment system of claim 3, wherein: each of the plurality of outlet flange perforations has a center point that is separated from the outlet flange center axis by a radius ($r_{perf}$) that is a function of a value k;
the outlet flange body outer portion has a radius $r_{of}$;

$$0.05 \leq k \leq 0.95; \text{ and}$$
$$r_{perf} = r_{if} + k(r_{of} - r_{if}).$$

5. The exhaust gas aftertreatment system of claim 1, wherein each of the plurality of outlet flange perforations has a diameter in a range of 2 millimeters to 30 millimeters, inclusive.

6. The exhaust gas aftertreatment system of claim 5, wherein:
the outlet flange has an outlet flange transverse axis that intersects a center point of the outlet flange body outer portion, the outlet flange transverse axis extends along an outlet flange plane that bisects the outlet flange body outer portion, the outlet flange plane is orthogonal to and intersecting the conduit center axis, and is parallel to the injection axis;
a center point of each of the plurality of outlet flange perforations is separated from the outlet flange transverse axis by an outlet flange perforation angle;
the outlet flange perforation angle is defined by an angle between (1) the outlet flange transverse axis and (2) a line between the center point of each of the plurality of outlet flange perforations and a center of the outlet flange; and each of the plurality of outlet flange perforations is located such that each of the outlet flange perforation angles is in a range of 5 degrees to 90 degrees, inclusive.

7. The exhaust gas aftertreatment system of claim 1, wherein the outlet flange angle is in a range of 120 degrees to 171 degrees, inclusive.

8. The exhaust gas aftertreatment system of claim 1, wherein: the mixer further comprises:
   a treatment fluid inlet disposed along the injection axis and configured to receive the treatment fluid from the injector,
   an upstream vane plate disposed upstream of the treatment fluid inlet and having a plurality of upstream vanes, at least one of the plurality of upstream vanes coupled to the mixer body, and
   a downstream vane plate disposed downstream of the treatment fluid inlet and having a plurality of downstream vanes, at least one of the plurality of downstream vanes coupled to the mixer body.

9. The exhaust gas aftertreatment system of claim 1, further comprising:
   a perforated dividing plate coupled to the introduction conduit and comprising:
      a perforated dividing plate body coupled to the introduction conduit, the perforated dividing plate centered on a perforated dividing plate transverse axis, and
      a plurality of perforated dividing plate perforations extending through the perforated dividing plate body, disposed circumferentially along the perforated dividing plate body, and defined by a perforated area, the perforated area is defined by a shape and is centered on a perforated area transverse axis that is offset from the perforated dividing plate transverse axis.

10. The exhaust gas aftertreatment system of claim 9, wherein the perforated dividing plate further comprises a perforated dividing plate panel disposed on the perforated dividing plate body and configured to seal at least one of the plurality of perforated dividing plate perforations.

11. The exhaust gas aftertreatment system of claim 1, further comprising:
   a partitioning plate coupled to the mixer body and comprising:
      a partitioning plate body coupled to the mixer body, the partitioning plate body centered on a partitioning plate transverse axis, and
      a partitioning plate opening extending through the partitioning plate body, the partitioning plate opening centered on a partitioning plate opening center axis that is offset from the partitioning plate transverse axis.

12. An exhaust gas aftertreatment system comprising:
   an introduction conduit centered on a conduit center axis;
   a dosing module coupled to the introduction conduit and comprising an injector that is configured to provide a treatment fluid into the introduction conduit and that is defined by an injection axis;
   a mixer disposed within the introduction conduit and comprising a mixer body configured to receive exhaust gas and the treatment fluid; and
   a perforated dividing plate coupled to the introduction conduit and comprising:
      a perforated dividing plate body coupled to the introduction conduit, the perforated dividing plate centered on a perforated dividing plate transverse axis,
      a plurality of perforated dividing plate perforations extending through the perforated dividing plate body, disposed circumferentially along the perforated dividing plate body, and defined by a perforated area, the perforated area is defined by a shape and is centered on a perforated area transverse axis that is offset from the perforated dividing plate transverse axis, and
      a perforated dividing plate panel disposed on the perforated dividing plate body and configured to seal at least one of the plurality of perforated dividing plate perforations.

13. The exhaust gas aftertreatment system of claim 12, wherein the perforated dividing plate panel is rectangular.

14. The exhaust gas aftertreatment system of claim 12, wherein the perforated dividing plate panel is circular.

15. The exhaust gas aftertreatment system of claim 12, wherein the perforated dividing plate panel is triangular.

16. An exhaust gas aftertreatment system comprising:
   an introduction conduit centered on a conduit center axis;
   a dosing module coupled to the introduction conduit and comprising an injector that is configured to provide a treatment fluid into the introduction conduit and that is defined by an injection axis;
   a mixer disposed within the introduction conduit and comprising a mixer body configured to receive exhaust gas and the treatment fluid; and
   a partitioning plate coupled to the mixer body and comprising:
      a partitioning plate body coupled to the mixer body, the partitioning plate body centered on a partitioning plate transverse axis, and
      a partitioning plate opening extending through the partitioning plate body, the partitioning plate opening centered on a partitioning plate opening center axis that is offset from the partitioning plate transverse axis;
   an outlet flange comprising an outlet flange body centered on an outlet flange center axis, the outlet flange body comprising:
      an outlet flange body inner portion coupled to the mixer body,
      an outlet flange body outer portion coupled to the introduction conduit, separating the outlet flange body inner portion from the introduction conduit, and extending at an outlet flange angle away from the outlet flange body inner portion and downstream of the mixer, the outlet flange angle being obtuse,
      an outlet flange opening extending through the outlet flange body inner portion, and
      a plurality of outlet flange perforations extending through the outlet flange body outer portion and arrayed circumferentially around a portion of the outlet flange opening;
   wherein the partitioning plate opening center axis is offset from the outlet flange center axis by a radial eccentric distance (e1) that is a function of an outlet flange body inner portion radius ($r_{if}$) and a partitioning plate opening radius ($r_{partitioning}$);
   $0.05\ (r_{if}-r_{partitioning}) \le e_1 \le 0.95(r_{if}-r_{partitioning})$.

* * * * *